(12) United States Patent
Laohakunakorn et al.

(10) Patent No.: US 11,674,096 B2
(45) Date of Patent: Jun. 13, 2023

(54) METHOD OF PROCESSING A BIO-BASED MATERIAL AND APPARATUS FOR PROCESSING THE SAME

(71) Applicant: GREEN TECHNOLOGY RESEARCH CO., LTD., Bangkok (TH)

(72) Inventors: Winai Laohakunakorn, Bangkok (TH); Supakorn Sirimitrtrakul, Bangkok (TH); Nopporn Boonsit, Samut Sakhon (TH)

(73) Assignee: GREEN TECHNOLOGY RESEARCH CO., LTD., Bangkok (TH)

( * ) Notice: Subject to any disclaimer, the term of this patent is extended or adjusted under 35 U.S.C. 154(b) by 0 days.

(21) Appl. No.: 16/960,066

(22) PCT Filed: Apr. 30, 2019

(86) PCT No.: PCT/TH2019/000010
§ 371 (c)(1),
(2) Date: Jul. 3, 2020

(87) PCT Pub. No.: WO2019/212421
PCT Pub. Date: Nov. 7, 2019

(65) Prior Publication Data
US 2021/0054292 A1  Feb. 25, 2021

(30) Foreign Application Priority Data
Apr. 30, 2018 (SG) .......................... 10201803633U
Jun. 20, 2018 (SG) .......................... 10201805293X

(51) Int. Cl.
*C10G 67/06* (2006.01)
*C10G 3/00* (2006.01)
(Continued)

(52) U.S. Cl.
CPC ............... *C10G 67/06* (2013.01); *B01D 3/14* (2013.01); *B01D 15/00* (2013.01); *B01J 8/0285* (2013.01);
(Continued)

(58) Field of Classification Search
CPC . C10G 3/46; C10G 3/49; C10G 67/06; C10G 3/50; C10G 3/54
See application file for complete search history.

(56) References Cited

U.S. PATENT DOCUMENTS 3,224,959 A * 12/1965 Brodeur ................. C10G 65/12
208/107
2010/0313468 A1* 12/2010 Jalalpoor .................. C11C 3/10
44/388
(Continued)

FOREIGN PATENT DOCUMENTS

WO  2007/003708 A1  1/2007
WO  2009/080287 A2  7/2009

OTHER PUBLICATIONS

International Search Report, Written Opinion of ISA, Written Opinion of IPEA, and International Preliminary Report on Patentability in PCT/TH2019/000010.
(Continued)

*Primary Examiner* — Renee Robinson
(74) *Attorney, Agent, or Firm* — JCIP; Joseph G. Chu; Jeremy I. Maynard

(57) ABSTRACT

A system for processing a renewable bio-based material comprising: a reactor, a feedstock substantially renewable and comprising triglycerides and free fatty acids, with hydrogen in the presence of a catalyst in a reactor to form a treated oil; a heat exchanger for receiving the treated oil from the reactor and reducing its temperature to a predetermined temperature; a high-pressure separator followed by a low-pressure separator; and (i) a distillation unit for passing
(Continued)

the treated oil through to form green diesel and an adsorption unit for passing the green diesel through; or (ii) at least one distillation column to separate the treated oil into at least one component and an adsorption column for passing the at least one component through; wherein the reactor comprises a cooling function for controlling the temperature of the reactor; wherein the cooling function is an internal cooling function comprising adding a cooling substance into the reactor.

16 Claims, 5 Drawing Sheets

(51) Int. Cl.
  *B01J 8/02* (2006.01)
  *C11C 3/12* (2006.01)
  *B01D 3/14* (2006.01)
  *B01D 15/00* (2006.01)
(52) U.S. Cl.
  CPC ............... *C10G 3/46* (2013.01); *C10G 3/49* (2013.01); *C10G 3/50* (2013.01); *C10G 3/54* (2013.01); *C11C 3/123* (2013.01); *C10G 2300/1011* (2013.01); *C10G 2300/1055* (2013.01); *C10G 2300/301* (2013.01); *C10G 2300/44* (2013.01); *C10G 2400/04* (2013.01); *C10G 2400/06* (2013.01); *C10L 2290/00* (2013.01)

(56) References Cited

U.S. PATENT DOCUMENTS

| | | |
|---|---|---|
| 2013/0338414 A1 | 12/2013 | Fingland et al. |
| 2014/0100395 A1 | 4/2014 | Felix et al. |
| 2015/0353841 A1* | 12/2015 | Rispoli ................ C10G 45/58 29/890 |
| 2017/0022424 A1 | 1/2017 | Chapus et al. |

OTHER PUBLICATIONS

Anonymous: "Tetradecane—Wikipedia", Sep. 14, 2016, XP055610792, Retrieved Aug. 5, 2019, https://en.wikipedia.org/w/index.php?title=Tetradecane&oldid=739410691 (Table 1).
Anonymous: "Hexadecane—Wikipedia", Feb. 18, 2014, XP055671615, Retrieved Feb. 25, 2020, https://en.wikipedia.org/w/index.php?title=%20Hexadecane&oldid=596019452.

* cited by examiner

METHOD OF PROCESSING A BIO-BASED MATERIAL AND APPARATUS FOR PROCESSING THE SAME

TECHNICAL FIELD OF THE INVENTION

The present invention relates to a method of processing a renewable resource, in particular a bio-based material, and an apparatus for processing the same.

BACKGROUND OF THE INVENTION

The following discussion of the background to the invention is intended to facilitate understanding of the present invention. However, it should be appreciated that the discussion is not an acknowledgment or admission that any of the material referred to was published, known or a part of the common general knowledge in any jurisdiction as at the priority date of the application.

Due to global warming and limited supply of non-renewable resources such as fossil fuel, crude oil and petroleum, there is a need to provide combustible liquid fuels that are available from alternative sources that are renewable. Usage of non-renewable resources may have significant impact on greenhouse gas emissions. Therefore, using alternative sources that are renewable may reduce greenhouse gas emissions and be more environmentally friendly compared to non-renewable resources.

Biofuel is being increasingly considered as a viable renewable resource for various applications, such as in engines. Examples of biofuel include biomass derivatives, biogases, and liquid fuels and can be widely divided into bioalcohols, biodiesel, green diesel, vegetable oil, bioethers, biogas, syngas and solid biomass fuels.

There are various challenges with using biofuel. For instance, the use of biofuel such as vegetable oil in engines requires significant engine modification, including changing of piping and injector construction materials so that engine performance may be maintained as compared to non-renewable resources such as diesel or petrol. Furthermore, maintenance costs may be increased due to higher wear and tear, which may lead to an increase in incidences of engine failure.

Furthermore, conventional methods of processing biofuel suffer from various drawbacks. For instance, vegetable oil may undergo transesterification with an alcohol such as methanol, thereby forming biodiesel. However, transesterification may be associated with drawbacks such as the need to pretreat the feedstock so that biodiesel of good quality may be obtained and by-products need to be removed before the biodiesel can be used and meet industry standards.

In addition, thermal or catalytic cracking of vegetable oils or animal oils may lead to a wide spectrum of possible unwanted products which may compromise the yield of the desired products. For instance, processes that makes use of a catalyst comprising alumina led to a generally unselective method, thereby leading to low purity and low yield of the desired products.

In light of the above, there exists a need for a method to process biofuel so that the treated biofuel may be suitable for use as a combustible liquid oil. There further exists a need to develop a method of processing a bio-based material that ameliorates at least one of the disadvantages mentioned above.

SUMMARY OF THE INVENTION

A technical problem to be solved by the disclosure or present invention is to provide a treated oil for making green diesel and phase change materials suitable for use in applications such as, but not limited to, engines, car parts and buildings. In particular, the treated oil of the present invention can be obtained through a method of processing without the need to use any petrochemical source as a starting material (or a raw material).

Another technical problem to be solved by the disclosure or present invention is to provide a method for processing a bio-based material such that high purity of desired products may be obtained.

In accordance with an aspect of the invention there is provided a method of processing a renewable bio-based material comprising the step of reacting the bio-based material with hydrogen in the presence of a catalyst on a support in a reactor to form a treated oil; (i) passing the treated oil through a distillation unit and an adsorption unit to form green diesel; and/or (ii) passing the treated oil through at least one distillation column to separate the treated oil into at least one component and passing the at least one component through an adsorption column; and wherein the reactor comprises a cooling function for controlling the temperature of the reactor; wherein the cooling function is at least one of an internal cooling function and an external cooling function. Advantageously, the treated oil may be obtained in a one-step method and further processed to form green diesel, PCM and/or industrial solvent using a combination of a distillation step and an adsorption step. Consequently, high purity of green diesel, PCM and/or industrial solvent may be obtained. More advantageously, as the treated oil can be independently and/or selectively processed to one or more desired products, such as green diesel, PCM and/or industrial solvent, the method is versatile and easily tunable. Furthermore, the method may lead to a savings in time and costs.

In various embodiments, the support is alumina ($Al_2O_3$), silica ($SiO_2$) or alumina-silica ($Al_2O_3$—$SiO_2$).

In various embodiments, the treated oil comprises at least one kind of n-paraffin and at least one kind of isoparaffin and the method further comprises the step of selecting the catalyst depending on whether a low volume of isoparaffins or a high volume of isoparaffins is desired.

In various embodiments, the support is $Al_2O_3$ and the catalyst on $Al_2O_3$ is selected from the group consisting of NiMo/$Al_2O_3$ and NiW/$Al_2O_3$.

In various embodiments, the support is $Al_2O_3$ and the catalyst on $Al_2O_3$ is selected from the group consisting of NiCoMo/$Al_2O_3$, NiMoP/$Al_2O_3$ and CoMo/$Al_2O_3$.

In various embodiments, the temperature in the reactor is 200° C. to 400° C.

In various embodiments, the temperature in the reactor is 250° C. to 350° C.

In various embodiments, the pressure in the reactor is 25 bar to 40 bar.

In various embodiments, the pressure in the reactor is 30 bar to 40 bar.

In various embodiments, the ratio of hydrogen to the bio-based material is 0.03 g hydrogen/g bio-based material to 0.10 g hydrogen/g bio-based material.

In various embodiments, the ratio of hydrogen to the bio-based material is 0.05 g hydrogen/g bio-based material to 0.07 g hydrogen/g bio-based material.

In various embodiments, the space velocity is 0.5 $h^{-1}$ to 2 $h^{-1}$.

In various embodiments, the method further comprises the step of purifying the treated oil.

In various embodiments, the step of purifying the treated oil comprises the step of passing the treated oil through a high-pressure separator followed by the step of passing through a low-pressure separator.

In various embodiments, the reactor is a trickle bed reactor or a packed bed reactor.

In various embodiments, the internal cooling function comprises adding a cooling substance into the reactor.

In various embodiments, the external cooling function is a multi tube or a shallow bed reactor with a heat transfer unit.

In various embodiments, the adsorption unit comprises at least one adsorbent selected from the group consisting of activated carbon, ion exchange resin, molecular sieve and chemical adsorbent.

In various embodiments, the at least one component is selected from the group consisting of n-paraffin having less than 16 carbon atoms, n-hexadecane, n-heptadecane, n-octadecane and n-paraffin having more than 18 carbon atoms.

In various embodiments, the adsorption column comprises at least one adsorbent selected from the group consisting of activated carbon, ion exchange resin, molecular sieve and chemical adsorbent.

In accordance with another aspect of the invention, there is provided a green diesel comprising isoparaffin in an amount of 0 to 10 wt % and n-paraffin in an amount of 90 to 100 wt %.

In various embodiments, the green diesel has a distillation range of 200° C. to 350° C.

In various embodiments, the green diesel has a flash point in the range of 100° C. to 130° C.

In various embodiments, the green diesel further comprises total glycerides less than 0.05 wt %.

In accordance with another aspect of the invention, there is provided a phase change material comprising isoparaffin in an amount of 0 to 1 wt % and n-paraffin in an amount of 99 to 100 wt %.

In accordance with another aspect of the invention, there is provided an industrial solvent comprising n-paraffin and a distillation range of 250° C. to 270° C.

In accordance with another aspect of the invention, there is provided a system for processing a renewable bio-based material comprising a reactor for reacting the bio-based material with hydrogen in the presence of a catalyst on a support to form a treated oil; and wherein the reactor comprises a cooling function for controlling the temperature of the reactor; (i) a distillation unit for passing the treated oil through to form green diesel and an adsorption unit for passing the green diesel through; and/or (ii) at least one distillation column to separate the treated oil into at least one component and an adsorption column for passing the at least one component through; wherein the cooling function is at least one of an internal cooling function and an external cooling function. Advantageously, the system may be relatively straightforward, simple and versatile because the treated oil may be obtained in a one-step and further processed to form green diesel, PCM and/or industrial solvent. Consequently, high purity of green diesel, PCM and/or industrial solvent may be obtained. Furthermore, the system may lead to a savings in time and costs.

In various embodiments, the internal cooling function comprises a cooling substance selected from the group consisting of a fresh amount of the bio-based material, a fresh amount of hydrogen, a portion of the treated oil and a combination thereof.

In various embodiments, the system further comprises a high-pressure separator and a low-pressure separator for passing the treated oil through.

In various embodiments, the external cooling function comprises a multi tube or a shallow bed reactor with a heat transfer unit.

In various embodiments, the external cooling function further comprises a coolant selected from the group consisting of a fresh amount of the bio-based material, a fresh amount of hydrogen, a portion of the treated oil, a combination thereof and a heat transfer fluid.

Specifically, an embodiment of the present invention relates to a method of processing a bio-based material to form a treated oil for making green diesel and phase change materials.

BRIEF DESCRIPTION OF THE DRAWINGS

The invention will now be described, by way of example only, with reference to the accompanying drawings, in which.

DETAILED DESCRIPTION

Figure 1:
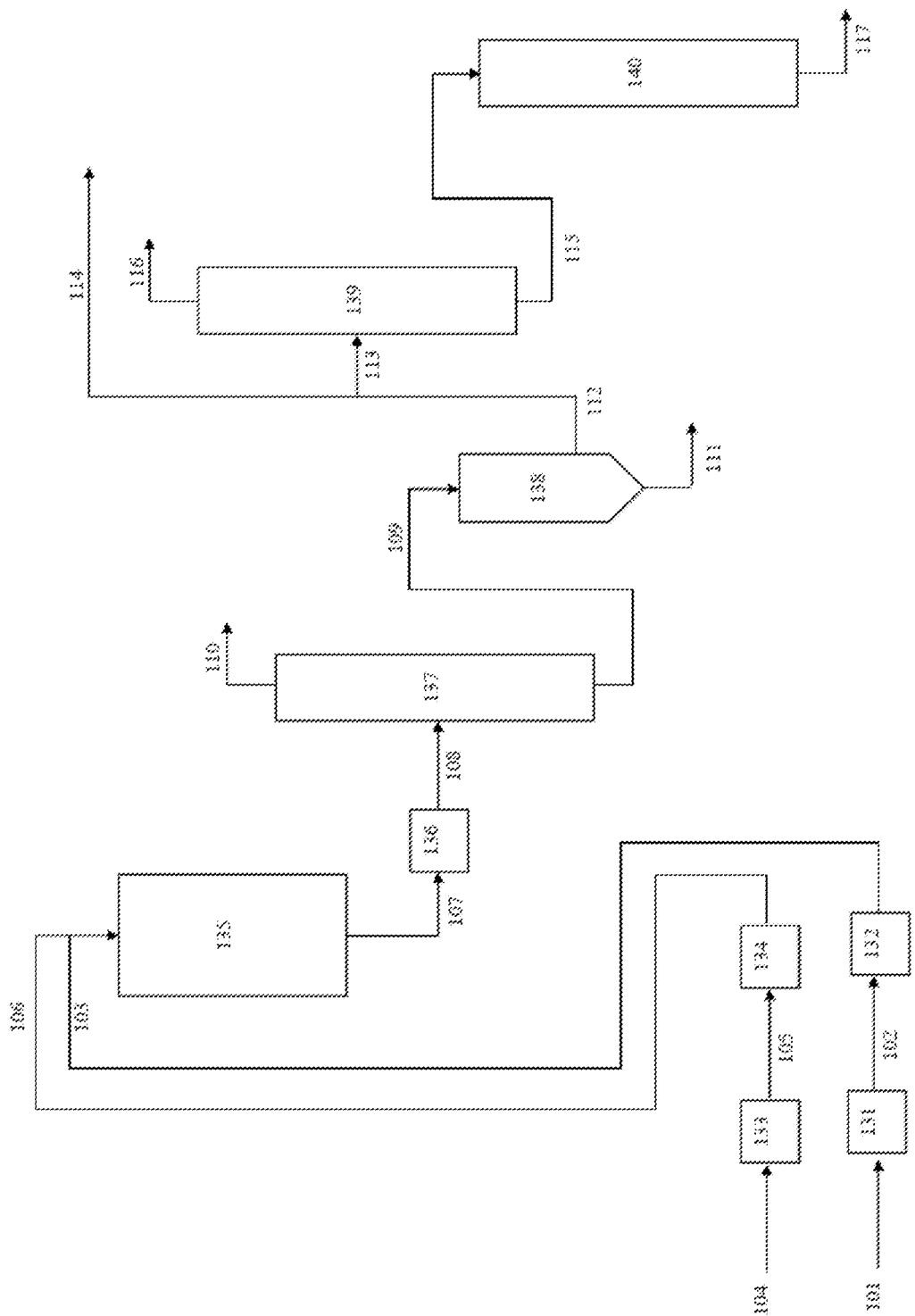
FIG. 1 illustrates a flow diagram of preparing treated oil from a bio-based material and green diesel using the treated oil.

Particular embodiments of the present invention will now be described with reference to the accompanying drawings. The terminology used herein is for the purpose of describing particular embodiments only and is not intended to limit the scope of the present invention. Additionally, unless defined otherwise, all technical and scientific terms used herein have the same meanings as commonly understood by one or ordinary skill in the art to which the present invention belongs. Where possible, the same reference numerals are used throughout the figures for clarity and consistency.

As used herein, the term "cetane number" refers to a quality that rates the ignition quality of green diesel.

As used herein, the term "density" refers to the ratio of mass of a particular fuel and volume occupied by the particular fuel.

As used herein, the term "cloud point" measures the first appearance of wax.

As used herein, the term "contaminant" refers to a substance that is not a desired product of the method of the present invention, such as but not limited to light hydrocarbons such as propane, hydrogen, water, carbon monoxide, carbon dioxide, nitrogen, sulphur, phosphorus, heavy metals, alkali metals, solids, detergent and acids.

As used herein, the term "cooling function" refers to the introduction of a cooling substance, coolant and/or a mechanical device/apparatus to decrease or at least maintain the temperature of the reactor to prevent overheating. The introduction of a cooling substance includes but is not limited to the introduction of a fresh amount of the bio-based material, introduction of a fresh amount of hydrogen, introduction of a portion of treated oil or introduction of a combination thereof. The introduction of coolants includes but is not limited to the introduction of a fresh amount of the bio-based material, introduction of a fresh amount of hydrogen, introduction of a portion of treated oil, introduction of a combination thereof or introduction of a heat transfer fluid. The mechanical device/apparatus for cooling the reactor includes but is not limited to a multi tube or, a shallow bed reactor with a heat transfer unit. The mechanical device/apparatus for cooling the reactor may be integrated with the reactor or may be a separate unit attachable/detachable from the reactor.

As used herein, the term "cooling substance" includes but is not limited to the term "quenching substance".

As used herein, the term "green diesel" refers to a biofuel that contains mainly paraffin which is derived from a renewable resource such as a bio-based material instead of a non-renewable resource such as a petroleum-based oil. In other words, there is no need for a non-renewable resource to make the green diesel.

As used herein, the term "low volume" when used in relation to the amount of isoparaffin refers to an amount of about 0 to about 5 wt %.

As used herein, the term "high volume" when used in relation to the amount of isoparaffin refers to an amount of more than 5 wt %.

As used herein, the term "paraffin" includes n-paraffins, isoparaffins and a mixture thereof. In various embodiments, the term "paraffin" refers to acyclic saturated hydrocarbons of general chemical formula $C_nH_{2n+2}$.

As used herein, the term "n-paraffin" refers to a normal paraffin or linear paraffin which is a straight-chain acyclic saturated hydrocarbon.

As used herein, the term "isoparaffin" refers to a branched paraffin which is a branched acyclic saturated hydrocarbon.

As used herein, the term "aromatics" refers to aromatic hydrocarbons, i.e. hydrocarbons containing at least one aromatic ring.

As used herein, the term "phase change material" or "PCM" refers to a material for maintaining the temperature of a system by means of heat transfer between the PCM and the system. When the temperature of the system is higher than the temperature of the PCM, heat will be transferred from the system to the PCM and it will decrease the temperature of the system. When the temperature of the system is lower than the temperature of the PCM, heat will be transferred from the PCM to the system and it will increase the temperature of the system. During the heat transfer process, the temperature of the PCM will stay the same (e.g. at the melting point of the PCM). Typically, the PCM can maintain the temperature of the system as at the melting point of the PCM.

As used herein, the term "treated oil" refers to a pure form of the oil or an impure form of the oil. The oil may comprise at least one kind of n-paraffin, at least one kind of isoparaffin or a combination thereof, and may be mixed with contaminants, gases and/or water.

As used herein, the term "kind" when used in relation to n-paraffin or isoparaffin refers to a paraffin comprising a specific number of carbon atoms such as a number in the range of 3 to 24.

As used herein, the term "reactant stream" refers to a feed comprising hydrogen and at least one bio-based material. The feed may also comprise treated oil. Throughout the specification, unless otherwise indicated to the contrary, the terms "comprising" "consisting of", and the like, are to be construed as non-exhaustive, or in other words, as meaning "including, but not limited to".

Throughout the specification, unless the context requires otherwise, the word "comprise" or variations such as "comprises" or "comprising", will be understood to imply the inclusion of a stated integer or group of integers but not the exclusion of any other integer or group of integers.

Throughout the specification, unless the context requires otherwise, the word "include" or variations such as "includes" or "including", will be understood to imply the inclusion of a stated integer or group of integers but not the exclusion of any other integer or group of integers.

As used herein, the term "about" typically means +/−5% of the stated value, more typically +/−4% of the stated value, more typically +/−3% of the stated value, more typically +/−2% of the stated value, even more typically +/−1% of the stated value, and even more typically +1-0.5% of the stated value.

Throughout this disclosure, certain embodiments may be disclosed in a range format. It is appreciable that the description in range format is merely for convenience and brevity and should not be construed as a limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. Ranges are not limited to integers, and can include decimal measurements. This applies regardless of the breadth of the range.

Other aspects of the invention will become apparent to those of ordinary skill in the art upon review of the following description of specific embodiments of the invention in conjunction with the accompanying figures.

In an aspect of the present invention, there is provided a method of processing a bio-based material, the process comprising reacting the bio-based material with hydrogen in the presence of a catalyst on a support in a reactor to form a treated oil; wherein the bio-based material is renewable.

Consequently, the treated oil is obtained in high yield by a one-step method involving a hydrotreating reaction. Advantageously, the hydrotreating reaction makes use of hydrogen which may bind to sulphur and phosphorus to remove impurities. In various embodiments, the treated oil may be obtained in a yield of about 80% to about 85% of the bio-based material. More advantageously, the treated oil does not require more than one step to obtain the treated oil, thereby leading to a savings in time and costs. In contrast, some prior art methods lead to an intermediate product which requires further processing to obtain a product that is substantially equivalent to the treated oil of the present invention. Consequently, such prior art methods require at least one additional step to process the intermediate product to obtain the product that is substantially equivalent to the treated oil of the present invention, thereby making such prior art methods more costly and more time-consuming.

In various embodiments, the bio-based material is a feedstock that is substantially renewable and comprises triglycerides and free fatty acids that may be derived from a plant (including a vegetable) or an animal or a combination thereof. The bio-based material includes but is not limited to animal oils such as tallow oil, train oil, fish oil or plant oils such as bleach palm oil (BPO), refined bleach palm oil (RBDPO), palm olein, palm stearin, palm fatty acid distillate, canola oil, corn oil, sunflower oil, soybean oil, oils from desertic plants such as jatropha oil and balanites oil, rapeseed oil, tall oil, hempseed oil, olive oil, linseed oil, mustard oil, peanut oil, castor oil, coconut oil, or one or more combinations thereof. The vegetable oil may be crude vegetable oil or refined or edible vegetable oil. In various embodiments, the plant oil and/or animal oil may be new oil, used oil, waste oil or a combination thereof. Advantageously, even though the bio-based material comprises triglycerides, the method of the present invention converts the triglycerides to a treated oil containing at least one kind of n-paraffin and at least one kind of isoparaffin almost completely, such that the treated oil is substantially free of triglycerides. Due to the reaction mechanism of the method for producing the treated oil, monoglycerides and diglycerides do not exist in the treated oil. As such, the total glyceride content in the treated oil is equivalent to the triglyceride content in the treated oil. It would be understood by a person skilled in the art that standard tests such as EN 14105 may be used to measure the total glyceride content. In various embodiments, there is about 0.038 wt % of total glycerides in the treated oil. In various embodiments, the treated oil is substantially free of triglycerides. In other words, there is less than 1 wt %, less than 0.8 wt %, less than 0.6 wt %, less than 0.5 wt %, less than 0.4 wt %, less than 0.3 wt %, less than 0.2 wt %, less than 0.1 wt %, or less than 0.05 wt % of triglycerides in the treated oil. In various embodiments, there is about 0.01 wt % to about 0.05 wt % of triglycerides in the treated oil. In various embodiments, there is about 0.038 wt % of triglycerides in the treated oil. In contrast, prior art methods lead to a treated oil that contains triglycerides, such as in an amount of 1 wt % or more.

In some embodiments, there is no need to mix the bio-based material with a petroleum-based material. As such, the method of the present invention is relatively more environmentally friendly than a method that makes use of a non-renewable resource such as a petroleum-based material or a mixture of a petroleum-based material and a bio-based material.

In various embodiments and as illustrated in FIG. 1, a bio-based material (stream 101) may be passed through a pump (apparatus 131), wherein apparatus 131 is adapted to control the flow rate and pressure of the bio-based material. As such, when stream 101 passes through apparatus 131, stream 102 is formed, wherein stream 102 comprises the bio-based material having a predetermined flow rate and pressure, and wherein the pressure of stream 102 is higher than the pressure of stream 101. Stream 102 then passes through a heat exchanger (apparatus 132), wherein apparatus 132 is adapted to increase the temperature of stream 102, thereby forming stream 103 which comprises the bio-based material having a predetermined temperature, wherein the temperature of stream 103 is higher than the temperature of stream 102.

In various embodiments and as illustrated in FIG. 1, hydrogen (stream 104) may be passed through a control valve or a compressor (apparatus 133), wherein apparatus 133 is adapted to control the flow rate and pressure of the hydrogen. As such, when stream 104 passes through apparatus 133, stream 105 is formed, wherein stream 105 comprises hydrogen having a predetermined flow rate and pressure, and wherein the pressure of stream 105 is higher than the pressure of stream 104. Stream 105 then passes through a heat exchanger (apparatus 134), wherein apparatus 134 is adapted to increase the temperature of stream 105, thereby forming stream 106 which comprises hydrogen having a predetermined temperature, wherein the temperature of stream 106 is higher than the temperature of stream 105.

In various embodiments and as illustrated in FIG. 1, stream 103 and stream 106 are introduced into a reactor (apparatus 135). Stream 103 and stream 106 may be introduced into apparatus 135 in the form of co-current.

In various embodiments, the method of the present invention may further comprise selecting the catalyst. In various embodiments, the catalyst may be selected from the group consisting of CoMo, NiMo, NiW, NiCoMo and NiMoP. In various embodiments, the catalyst may be in the form of sulphide active phases, so that the amount of sulfur in the treated oil may be adjusted/adulterated. Advantageously, the catalyst may be adequately resistant to catalyst poisons, such that the efficiency of the catalyst may be maintained throughout the method. Furthermore, the catalyst may be recycled and reused, thereby lowering the operating costs because a new catalyst may not be necessary. In various embodiments, the efficiency of the catalyst may be recovered by, such as but not limited to, adding a sulfidation agent. The sulfidation agent may be selected from the group consisting of carbon disulfide, dimethyl disulfide, polysulfide oil, mercaptan and hydrogen sulfide.

In various embodiments, the catalyst may be selected based on whether the desired treated oil should contain a low volume of isoparaffins or a high volume of isoparaffins. In various embodiments, the catalyst is selected from the group consisting of NiMo and NiW if the desired treated oil should contain a low volume of isoparaffins. In a preferred embodiment, the catalyst is NiMo if the desired treated oil should contain a low volume of isoparaffins. In various embodiments, the catalyst is selected from the group consisting of NiCoMo, NiMoP and CoMo if the desired treated oil should contain a high volume of isoparaffins. In a preferred embodiment, the catalyst is NiCoMo if the desired treated oil should contain a high volume of isoparaffins.

In various embodiments, the catalyst comprises at least one of the two transition metals selected from the group consisting of Ni and Mo. In various embodiments, the catalyst further comprises another transition metal or a group V element.

In various embodiments, the catalyst loading may be about 0.5 wt % to about 20 wt %. The amount of catalyst used may be calculated based on the amount of the bio-based material and hydrogen.

In various embodiments, the catalyst may be separated into one or more portions. When the catalyst is separated into more than one portions, the extent of the reaction between the bio-based material and hydrogen may be controlled. As the reaction between the bio-based material and hydrogen is an exothermic reaction, the amount of heat produced may be controlled. Consequently, the temperature in the reactor may be controlled.

In various embodiments, the catalyst may be loaded on a support, such as an acidic porous solid support. The acidic porous solid support may be alumina ($Al_2O_3$), silica ($SiO_2$) or a mixture of alumina and silica ($Al_2O_3$—$SiO_2$). By reacting the bio-based material with hydrogen in the presence of the catalyst on the support, hydrogenation of the olefinic or unsaturated portions of the n-paraffinic chains of the bio-based material may occur. As the support may act as a high surface area support for the catalyst, greater efficiency of the catalyst may be achieved. In particular, desired reactions such as hydrogenation, deoxygenation and isomerization may occur with greater efficiency because the catalyst is better dispersed.

In various embodiments, the support may be such as but not limited to fluoride alumina, ZSM-12, ZSM-21, ZSM-22, ZSM-23, ZSM-32, ZSM-35, ZSM-38, ZSM-48, ZSM-57, SAPO-11, SAPO-31, SAPO-41, MAPO-11, MAPO-31, Y zeolite, L zeolite and Beta zeolite.

In various embodiments, the hydrogen may be fresh hydrogen or recycled hydrogen or a mixture thereof.

In various embodiments and as illustrated in FIG. 1, stream 103 and stream 106 may react by contacting the surface of the catalyst in the reactor, thereby producing a treated oil (stream 107). In various embodiments, stream 107 then passes through a heat exchanger (apparatus 136), wherein apparatus 136 is adapted to reduce the temperature of stream 107, thereby forming stream 108 which comprises treated oil having a predetermined temperature, wherein the temperature of stream 108 is lower than the temperature of stream 107.

In various embodiments, the method of the present invention may occur under hydrotreating conditions in the reactor. In particular, the method of the present invention may be carried out at a temperature of about 200° C. to about 400° C., about 250° C. to about 400° C., about 250° C. to about 350° C. or about 300° C. to about 350° C. and a pressure of about 25 bar to about 50 bar, about 25 bar to about 40 bar, about 30 bar to about 40 bar or about 35 bar to about 40 bar. Advantageously, the temperature is relatively low compared to prior art methods. Consequently, less undesired products may be formed. In a preferred embodiment, the temperature in the reactor is about 300° C. to about 350° C. because the yield of the desired products would be higher.

In various embodiments, decarboxylation, and/or hydrodeoxygenation and/or isomerization of the bio-based material may also occur because of the choice of catalyst.

In various embodiments, hydrocracking may be inhibited, thereby maintaining the range of carbon number of hydrocarbons formed in the range of $C_{14}$ to $C_{18}$. Typically, hydrocracking is an undesirable reaction because it may lead to a decreased amount of PCM in the treated oil, thereby resulting in a lower yield of PCM production. As hydrocracking may be inhibited or minimized by the method of the present invention, the yield of PCM may be advantageously higher than prior art methods because the PCM portion in the treated oil may be higher.

In various embodiments, the method of the present invention may be carried out at a space velocity of about 0.5 per hour ($hr^{-1}$) to about 2 $hr^{-1}$ or about 1.0 $hr^{-1}$. The inventors found that an increase in the space velocity may increase the quantity of treated oil and its products thereof because of the greater capacity to support a higher volume of feedstock. However, there may be a decrease in the reaction time and decrease in the quality of the treated oil and its products thereof. It was also found that a decrease in the space velocity will increase the reaction time and increase the quality of the treated oil and its products thereof, albeit in a lower quantity. If the space velocity is lower than about 0.5 $hr^{-1}$, there may be a drop in the quality and quantity of the treated oil and its products thereof. In a preferred embodiment, when the space velocity is about 1.0 $hr^{-1}$, there is a balance of the quantity and quality of the treated oil and its products thereof.

In various embodiments, the ratio of hydrogen to the bio-based material (for instance, oil) may be about 0.03 g hydrogen/g oil to about 0.10 g hydrogen/g oil, about 0.05 g hydrogen/g oil to about 0.07 g hydrogen/g oil or about 0.05 g hydrogen/g oil to about 0.08 g hydrogen/g oil. If the ratio of hydrogen to the oil is more than 0.1 g hydrogen/g oil, a beneficial effect will not be observed because there is sufficient hydrogen when the ratio of hydrogen to the oil is less than 0.1 g hydrogen/g oil. In other words, 0.03-0.10 g hydrogen/g oil is sufficient. This may advantageously lead to the lowering of operation costs because only a relatively small amount of hydrogen is necessary.

In various embodiments, an increase in the pressure of hydrogen can increase the solubility of hydrogen in the bio-based material, thereby facilitating the hydrogenation reaction. As such, the hydrogenation reaction may occur efficiently. Advantageously, the hydrogenation may occur at a relatively low pressure, there may be an economic advantage because compressors top pressurize the hydrogen are not necessary. Furthermore, the reactor and other equipment costs may be reduced because operation is at a relatively low pressure.

In various embodiments, the method further comprises purifying the treated oil. This is because the treated oil may be mixed with a gaseous component, such that the obtained products from the reactor is a mixture of the treated oil and the gaseous component. In various embodiments, purifying the treated oil comprises passing the treated oil through a high-pressure separator followed by a low-pressure separator. In various embodiments, the high-pressure separator may act as a separator and operate at a pressure similar to the pressure of the reactor. The high-pressure separator may separate the gaseous component, which may be predominantly hydrogen, form the treated oil. In various embodiments, the gaseous component may further comprise carbon dioxide, carbon monoxide and propane. The carbon dioxide may be removed by a method such as but not limited to pressure swing absorption, absorption with an amine or reaction with a hot carbonate solution. Furthermore, carbon monoxide and propane may be removed by the high-pressure separator. In various embodiments, the high-pressure separator and/or the low-pressure separator may remove the light fraction, whereby the light fraction may contain propane and/or sulfur-containing compounds. Advantageously, the separating process that makes use of the high-pressure separator and/or the low-pressure separator requires a smaller amount of energy and is a simpler process compared to a process for removing the heavy fraction (such as triglycerides or heavy paraffin content having more than 20 carbon atoms).

In various embodiments and as illustrated in FIG. 1, stream 108 passes through a high-pressure separator (apparatus 137) to obtain a purified treated oil (stream 109) and a gaseous component (stream 110). In various embodiments, apparatus 137 operates at a pressure similar to the pressure in apparatus 135.

In various embodiments, stream 110 may be treated.

In various embodiments and as illustrated in FIG. 1, stream 109 passes through a low-pressure separator (apparatus 138). After passing through apparatus 137, the pressure of the purified treated oil (stream 109) may decrease and enter apparatus 138, wherein water (stream 111), which is a by-product may be separated from stream 108 to form a more purified treated oil (stream 112).

In various embodiments, the reactor is a trickle bed reactor (such as but not limited to a narrow tube-type), a packed bed reactor, a shallow bed reactor or a basket-type reactor. Each bed is adapted to contain the catalyst, which may be in the form of solid particles.

In various embodiments, there may be at least one bed. In various embodiments, there may be two, three, four or five beds, which can be configured in series.

In various embodiments, the catalyst may be separated into more than one portion because of the presence of more than one bed in the reactor. Advantageously, when the beds are configured in series, a higher conversion rate may be achieved because any unreacted bio-based material that passes through a first bed may be hydrogenated when passing through a second or subsequent bed. In various embodiments, the size of each bed may be adjusted and the number of beds in the reactor may also be adjusted. When more than one bed is used, there may be better temperature control because the extent of the reaction between the bio-based material and hydrogen may be controlled. As the reaction between the bio-based material and hydrogen is an exothermic reaction, the amount of heat produced may be controlled. Consequently, the temperature in the reactor may be controlled.

In various embodiments, the reactor further comprises a cooling function for controlling the temperature of the reactor. This is because reactions such as hydrogenation and deoxygenation are highly exothermic reactions. As such, the cooling function advantageously maintains the temperature of the reactor at a suitable temperature range. In particular, the cooling function minimizes or avoids overheating of the reactor, thereby allowing the reactor's temperature profile to be optimized, such that the temperature of the reactor is at (or around) an optimal temperature. As used herein, the term "optimal temperature" is defined as a temperature (or temperature range) which the catalyst in the reactor is most active at catalyzing the desired reaction instead of catalyzing one or more unwanted side reactions (such as hydrocracking). For instance, when the feed comprises bio-based material (such as when the feed consists essentially of bio-based material), the feed may be introduced into the reactor at multiple points along the length of the reactor. Consequently, the feed comprising bio-based material may be introduced at a temperature that is near to the optimal temperature. Compared to prior art, the feed comprising bio-based material may be advantageously introduced at a temperature that is nearer to the optimal temperature. This can arise because by introducing the feed comprising bio-based material at multiple points along the length of the reactor, optimized temperature profile of the reactor may be achieved, which may result in better distribution of temperature within (or throughout) the reactor. Consequently, the catalyst used in the method of the present invention may be better utilized, and a greater efficiency of the catalyst may be achieved and production rate can be increased. More advantageously, the occurrence of side reactions may be prevented. Side reactions may occur as a result of failure to control the temperature of the reactor, such that the temperature of the reactor may lead to a decrease in the yield of the treated oil. If the reactions such as hydrogenation and deoxygenation occur too quickly, they may be uncontrollable and the temperature of the reaction may in turn be uncontrollable.

In various embodiments, the cooling function comprises an internal cooling function and/or an external cooling function.

In various embodiments, the internal cooling function may operate by means of quenching (or internal cooling). Internal cooling is a method of introducing a cooling substance (such as Q1, Q2 in FIG. 4) having a lower temperature (such as inlet temperature $T_q$ in FIG. 4) than the temperature of the reactor, thereby maintaining the temperature of the reactor at a suitable temperature. Examples of the substance for internal cooling include but is not limited to a fresh amount of the bio-based material, a fresh amount of hydrogen, a portion of treated oil or a combination thereof. The portion of treated oil used as the cooling substance may be freshly prepared or prepared in a previous batch.

In various embodiments, the cooling substance may be introduced into the reactor in a single portion or more than one portion and may be dependent on the number of beds in the reactor. In various embodiments, the cooling substance may be introduced into the reactor using a nozzle. In various embodiments, the nozzle may be pointed at any angle ranging from perpendicular to the flow of the reactant stream and parallel to the flow of the reactant stream (i.e. cocurrent). In various embodiments, the nozzle is not pointed against the flow of the reactant stream (i.e. countercurrent). In contrast, prior art methods may introduce the cooling substance through a nozzle, such that the cooling substance is against the flow of the reactant stream (i.e. countercurrent). When the nozzle points upwards, it is countercurrent to the flow of the reactant stream. As such, the cooling substance may be accumulated above and/or around the catalyst (such as at a lower end of a catalyst bed, such as a lower end of a first bed, a lower end of a second bed and/or a lower end of a subsequent bed), such that the cooling substance may cause over reaction and/or overheating. For instance, overheating may occur if the cooling substance is a bio-based material. This difference may have an effect on the performance and capability of the internal cooling function. For instance, a fresh amount of the bio-based material can be used as the cooling substance of the present invention, whereas it is not favorable to use a fresh amount of the bio-based material for such prior art methods. For prior art methods, the use of a fresh amount of bio-based material as the cooling substance may result in the formation of a hot spot that can negatively affect the quality of the treated oil and its products thereof and/or negatively affect operation of the method. In various embodiments, the volume of each portion of the cooling substance may be adjustable from 0 to 100 wt % of the total volume of cooling substance. In various embodiments, the total volume of cooling substance may be dependent on the range of temperature to be controlled. For instance, if the temperature increase is relatively high (in other words, the range of temperature to be controlled is relatively big), it may be necessary to use a greater volume of cooling substance.

In various embodiments, as the reaction between the bio-based material and hydrogen is an exothermic reaction, a significant amount of heat is produced. By using a cooling substance, the temperature in the reactor may be decreased. In various embodiments, the cooling substance may be introduced via an inlet connected to the reactor. In various embodiments, a first cooling substance may be introduced via an inlet and the first cooling substance may be distributed over a cross section of a bed of the reactor. The reactant stream from the bed may then contact the first cooling substance at an interface of the bed and an adjacent bed, such that the temperature of the reactant stream is decreased. After the reactant stream contacts the adjacent bed, the temperature of the reactant stream may increase because of the reaction between the bio-based material and hydrogen. Subsequently, another cooling substance may be introduced via another inlet connected to the reactor, the cooling substance may likewise lower the temperature of the reactant stream when the reactant stream contacts the cooling substance. Consequently, the temperature of the reactant stream may be controlled and maintained at a suitable temperature range.

Figure 4:
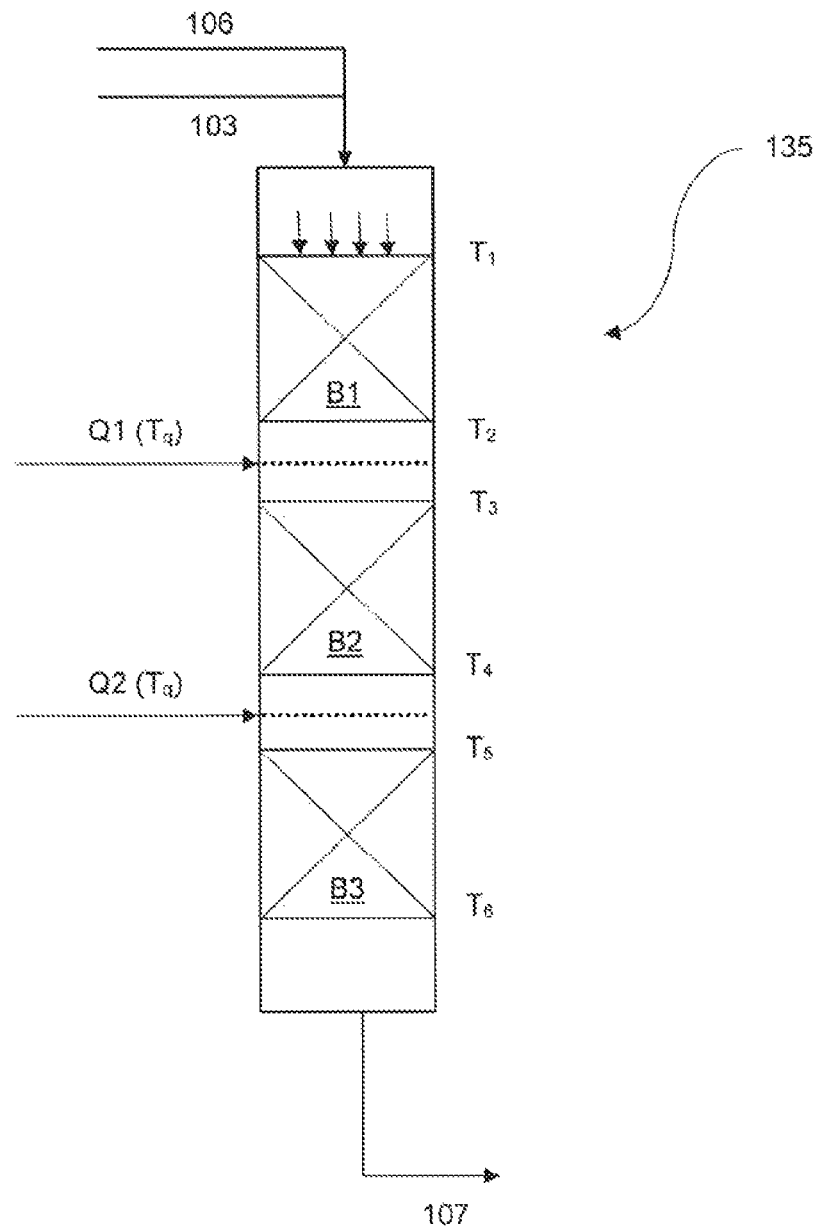
FIG. 4 illustrates a flow diagram of the reactor comprising an internal cooling function.

In various embodiments and as illustrated in FIG. 4, after stream 103 and stream 106 passes through a first bed (B1) and they react in the presence of the catalyst, the temperature in the reactor 135 may change (or increase) from a first temperature ($T_1$) to a second temperature ($T_2$). For instance, the first temperature may be about 320° C. and the second temperature may be about 380° C. The increase in temperature is because the reaction between the bio-based material and hydrogen is an exothermic reaction, thereby producing a significant amount of heat. Subsequently, a cooling substance (Q1) may be introduced at the interface (denoted by a dotted line) between the first bed (131) and a second bed (B2), such that the cooling substance (Q1) causes the temperature in the reactor 135 to change (or decrease) from the second temperature ($T_2$) to a third temperature ($T_3$). In various embodiments, the third temperature ($T_3$) may be the same temperature as the first temperature ($T_1$) or a different temperature, as long as the third temperature ($T_3$) is lower than the second temperature ($T_2$). In various embodiments, the cooling substance (Q1) having an inlet temperature ($T_q$) mixes with the reactant stream, which flows from the first bed (B1) to the second bed (B2). Thus in such embodiments it may be appreciable that the cooling substance (Q1) performs an internal cooling function. After the bio-based material (stream 103) and hydrogen (stream 106) passes through the second bed (B2) and the two substances react in the presence of the catalyst, the temperature in the reactor 135 may change (or increase) from the third temperature ($T_3$) to a fourth temperature ($T_4$). In various embodiments, the fourth temperature ($T_4$) may be the same temperature as the second temperature ($T_2$) or a different temperature, as long as the fourth temperature ($T_4$) is higher than the third temperature ($T_3$).

In various embodiments and as illustrated in FIG. 4, a fresh portion of the cooling substance (Q2) may be introduced at the interface (denoted by a dotted line) between the second bed (B3) and a third bed (B3), such that the cooling substance (Q2) causes the temperature in the reactor 135 to change (or decrease) from the fourth temperature ($T_4$) to a fifth temperature ($T_5$). In various embodiments, the fifth temperature ($T_5$) may be the same temperature as the first/third temperature ($T_1/T_3$) or a different temperature, as long as the fifth temperature ($T_5$) is lower than the fourth temperature ($T_4$). In various embodiments, the cooling substance (Q2) having an inlet temperature ($T_q$) mixes with the reactant stream, which flows from the second bed (12) to the third bed (B3). Thus in such embodiments it may be appreciable that the cooling substance (Q2) performs an internal cooling function. After the bio-based material (stream 103) and hydrogen (stream 106) passes through the third bed (B3) and the two substances react in the presence of the catalyst, the temperature in the reactor 135 may change (or increase) from the fifth temperature ($T_5$) to a sixth temperature ($T_6$). In various embodiments, the sixth temperature ($T_6$) may be the same temperature as the second/fourth temperature ($T_2/T_4$) or a different temperature, as long as the sixth temperature ($T_6$) is higher than the fifth temperature ($T_5$).

In various embodiments, the external cooling function may be such as but not limited to a multi tube or a shallow bed reactor with a heat transfer unit. As such, in various embodiments, the shallow bed reactor works in combination with the heat transfer unit.

In various embodiments, as the reaction between the bio-based material and hydrogen is an exothermic reaction, a significant amount of heat is produced. The temperature in the reactor can be decreased using the external cooling function.

Figure 5:
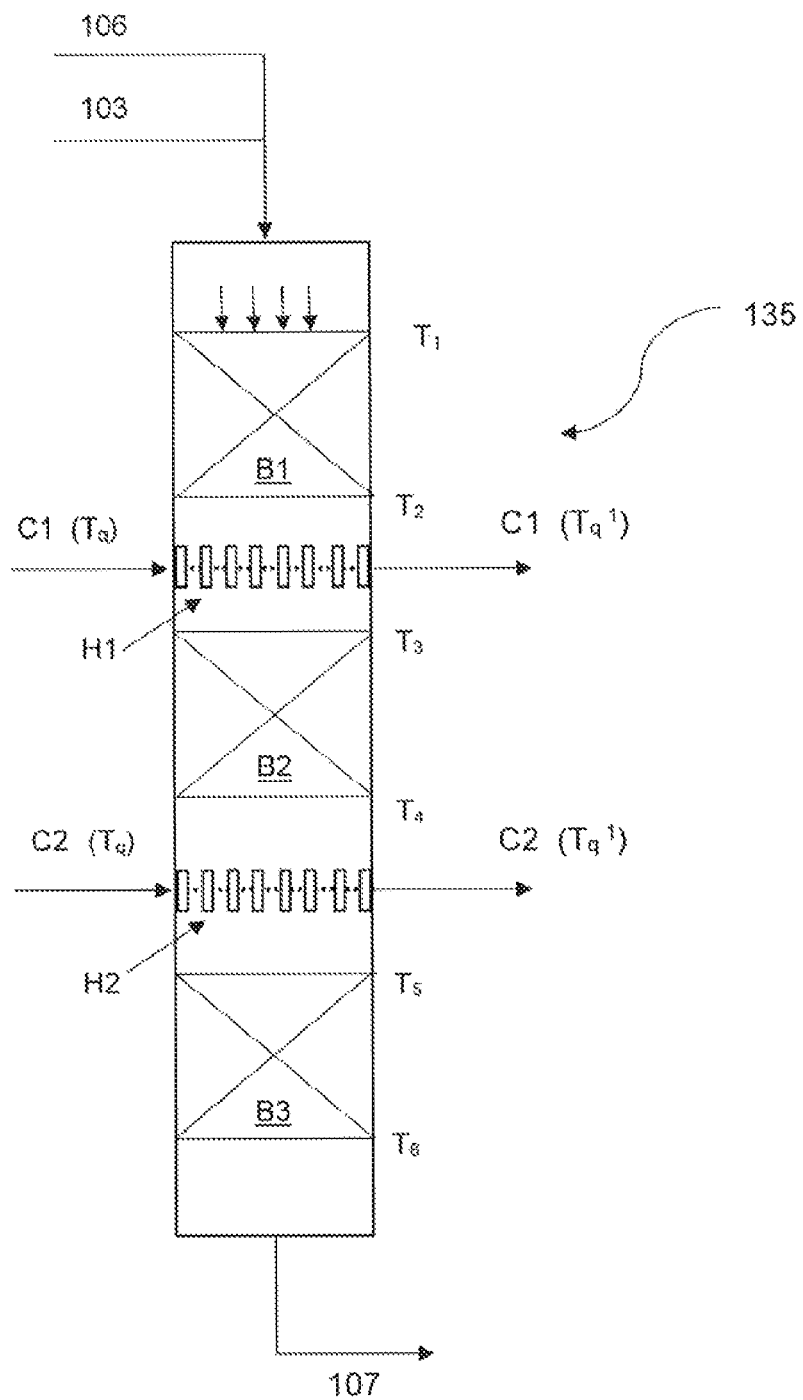
FIG. 5 illustrates a flow diagram of the reactor comprising an external cooling function.

In various embodiments and as illustrated in FIG. 5, the external cooling function is a heat transfer unit (H1, H2) that may be added as an integral part of the reactor at an interface (denoted by a dotted line) of a bed and an adjacent bed. For instance, the interface may be between a first bed (B1) and a second bed (B2) or between the second bed (B2) and a third bed (B3). In various embodiments, the heat transfer unit (H1, H2) is a shell and tube heat exchanger.

In various embodiments, the reactant stream from a bed may contact the heat transfer unit at an interface of the bed and an adjacent bed, such that the temperature of the reactant stream is decreased. After the reactant stream contacts the adjacent bed, the temperature of the reactant stream may increase because of the reaction between the bio-based material and hydrogen. Subsequently, another heat transfer unit may be installed at an interface of the adjacent bed and another adjacent bed. The heat transfer unit may likewise lower the temperature of the reactant stream when the reactant stream contacts the heat transfer unit. Consequently, the temperature of the reactant stream may be controlled and maintained at a suitable temperature range.

In various embodiments, a coolant (such as C1, C2 in FIG. 5) having a lower temperature (such as inlet temperature $T_q$ in FIG. 5) than the temperature of the reactor may be introduced into the heat transfer unit, such as via the shell side of the heat transfer unit. In various embodiments, the reactant stream which may pass through the tube side of the heat transfer unit will transfer heat energy to the coolant, thereby maintaining the temperature of the reactor at a suitable temperature. In various embodiments, the exchanging of heat energy between the coolant and the reactant stream occurs without mixing of the reactant stream with the coolant. Thus in such embodiments it may be appreciable that the coolant performs an external cooling function. Consequently, the temperature of the reactant stream will decrease and the temperature of the coolant will increase. As the temperature of the reactant stream decreases, the temperature of the reactor is maintained at a suitable temperature.

Examples of the coolant include but are not limited to a fresh amount of the bio-based material, a fresh amount of hydrogen, a portion of treated oil, or a combination thereof, or a heat transfer fluid. The portion of treated oil used as the coolant may be freshly prepared or prepared in a previous batch.

In various embodiments, the coolant may be introduced into the apparatus for cooling the reactor in a single portion or more than one portion and may be dependent on the number of beds in the reactor. In various embodiments, the volume of each portion of the coolant may be adjustable from 0 to 100 wt/of the total volume of coolant. In various embodiments, the total volume of coolant may be dependent on the range of temperature to be controlled. For instance, if the temperature increase is relatively high (in other words, the range of temperature to be controlled is relatively big), it may be necessary to use a greater volume of coolant.

In various embodiments and as illustrated in FIG. 5, after stream 103 and stream 106 passes through the first bed (B1) and they react in the presence of the catalyst, the temperature in the reactor 135 may change (or increase) from a first temperature ($T_1$) to a second temperature ($T_2$). For instance, the first temperature may be about 320° C. and the second temperature may be about 380° C. The increase in temperature is because the reaction between the bio-based material and hydrogen is an exothermic reaction, thereby producing a significant amount of heat. Subsequently, the reactant stream may flow through a side (such as the tube side) of the heat transfer unit (H1) which is located at the interface (denoted by a dotted line) between the first bed (B1) and a second bed (B2), and coolant (C1) may be introduced into aside (such as the shell side) of the heat transfer unit (H1), such that the coolant (C1) causes the temperature in the reactor 135 to change (or decrease) from the second temperature ($T_2$) to a third temperature ($T_3$).

In various embodiments, the third temperature ($T_3$) may be the same temperature as the first temperature ($T_1$) or a different temperature, as long as the third temperature ($T_3$) is lower than the second temperature ($T_2$). Consequently, the coolant (C1) having an initial temperature (inlet temperature $T_q$) would have a final temperature (outlet temperature $T_q^1$), wherein the initial temperature is lower than the final temperature. After the bio-based material (stream 103) and hydrogen (stream 106) passes through the second bed (B2) and the two substances react in the presence of the catalyst, the temperature in the reactor 135 may change (or increase) from the third temperature ($T_3$) to a fourth temperature ($T_4$). In various embodiments, the fourth temperature ($T_4$) may be the same temperature as the second temperature ($T_2$) or a different temperature, as long as the fourth temperature ($T_4$) is higher than the third temperature (T). In various embodiments and as illustrated in FIG. 5, the reactant stream may flow through a side (such as the tube side) of a heat transfer unit (H2) which is located at the interface (denoted by a dotted line) between the second bed (B2) and a third bed (B3), and coolant (C2) may be introduced into a side (such as the shell side) of the heat transfer unit (H2), such that the coolant (C2) causes the temperature in the reactor 135 to change (or decrease) from the fourth temperature ($T_4$) to a fifth temperature ($T_5$). In various embodiments, the fifth temperature ($T_5$) may be the same temperature as the first/third temperature ($T_1/T_3$) or a different temperature, as long as the fifth temperature ($T_5$) is lower than the fourth temperature ($T_4$). Consequently, the coolant (C2) having an initial temperature (inlet temperature $T_q$) would have a final temperature (outlet temperature $T_q^1$), wherein the initial temperature is lower than the final temperature. After the bio-based material (stream 103) and hydrogen (stream 106) passes through the third bed (B3) and the two substances react in the presence of the catalyst, the temperature in the reactor 135 may change (or increase) from the fifth temperature ($T_5$) to a sixth temperature ($T_6$). In various embodiments, the sixth temperature ($T_6$) may be the same temperature as the second/fourth temperature ($T_2/T_4$) or a different temperature, as long as the sixth temperature ($T_6$) is higher than the fifth temperature ($T_5$).

In various embodiments, the treated oil can be further processed to form green diesel and/or a phase change material (PCM). In various embodiments, the treated oil can be further processed to form an industrial solvent. In various embodiments, further processing of the treated oil to form green diesel, PCM and/or industrial solvent makes use of a combination of a distillation step and an adsorption step. It is appreciable that the ratio of treated oil that undergoes further processing to form green diesel to the PCM and the industrial solvent is from 1:0 to 0:1. In other words, there is no limitation to the ratio of treated oil that undergoes further processing to form green diesel to the PCM and the industrial solvent. As used herein, the term "PCM portion" when used in the context of treated oil, refers to the proportion (or ratio) of treated oil that undergoes further processing to form PCM and the industrial solvent.

In various embodiments, the treated oil produced by the method of the present invention may contain a low volume of isoparaffins or a high volume of isoparaffins. Isoparaffins obtained from the method of the present invention may be substantially free of sulfur, olefins and aromatics, non-toxic and do not lead to the formation of harmful products during combustion. As used herein, the term "substantially free" when used in the context of a byproduct (e.g. sulfur, olefins, aromatics or a mixture thereof) in the treated oil refers to an amount of less than 100 parts per million by weight (ppmw), less than 50 ppmw, less than 20 ppmw, less than 10 ppmw, less than 5 ppmw or less than 1 ppmw in the treated oil.

In various embodiments, when treated oil is further processed to form PCM, the PCM may be substantially free of sulfur, aromatics and alcohols. As used herein, the term "substantially free" when used in the context of a byproduct (e.g. sulfur, aromatics, alcohols or a mixture thereof) in PCM refers to an amount of less than 100 ppmw, less than 50 ppmw, less than 20 ppmw, less than 10 ppmw, less than 5 ppmw or less than 1 ppmw in the PCM. Advantageously and as illustrated in Table 7, PCM obtained using the treated oil may be substantially free of sulfur, aromatics and alcohols.

In various embodiments, a high volume of isoparaffins may be desired. In various embodiments, there is no need to contact the treated oil with an isomerization catalyst under isomerization conditions to at least partially isomerize the n-paraffins to isoparaffins. This is because the treated oil may comprise a high volume of isoparaffins. In particular, the catalyst used in the process of the present invention may cause isomerization of the bio-based material to occur, thereby producing a high volume of isoparaffins. In contrast, prior art methods may require isomerization of the treated oil because the treated oil may comprise essentially all n-paraffins, thereby having poor cold flow properties. As such, if it is desirable to improve the cold flow properties of the treated oil, the treated oil obtained using prior art processes may require an additional step of isomerization.

In various embodiments, a low volume of isoparaffins may be desired. Generally, it is difficult if not impossible to separate isoparaffin from normal paraffin (n-paraffin, n-C15 to n-C18). If there is a high volume of isoparaffin in the treated oil, the resulting PCM would contain isoparaffin as an impurity and the purity of n-paraffin of the PCM would not reach 99 wt %. In various embodiments, the purity of n-paraffin of the PCM is about 99 wt %. In various embodiments, the PCM comprises at least 99 wt % of n-paraffin, wherein the n-paraffin may be at least one kind of n-paraffin. Consequently, the PCM is obtained in high purity and consists essentially of n-paraffin.

In various embodiments, the method further comprises passing the treated oil through a distillation unit and an adsorption unit to form green diesel. In other words, the distillation unit is coupled to the adsorption unit. For example, the distillation unit is connected to the adsorption unit. Advantageously, the quality of the green diesel is comparable or better than green diesel produced by prior art methods. In various embodiments, the flash point of the green diesel of the present invention is relatively higher than the flash point of green diesel produced by prior art methods. This may be because the treated oil is passed through the distillation unit. In various embodiments, the distillation unit comprises at least one distillation column. In various embodiments, the green diesel may be obtained in a yield of about 80% to about 85% of the bio-based material. In various embodiments, the isoparaffin content in green diesel is in the range of about 0 wt % to about 10 wt % and the n-paraffin content in green diesel is in the range of about 90 wt % to about 100 wt %.

In various embodiments and as illustrated in FIG. 1, the treated oil for making green diesel (stream 113, wherein the composition of stream 112 is identical to stream 113) passes through a distillation unit (apparatus 139) followed by an adsorption unit (apparatus 140). In various embodiments, stream 113 passes through apparatus 139, which may comprise a distillation tower operating at atmospheric pressure or under vacuum for separating out low boiling point hydrocarbon compounds (stream 116), so that the green diesel obtained may have a higher cetane number and lower volume of sulphur. In various embodiments, the cetane number is at least 100. In various embodiments, the green diesel obtained has a cetane number of about 100 to about 105. In contrast, prior art methods may lead to a green diesel having a lower cetane number. As such, the green diesel of the present invention may have a relatively higher flash point compared to prior art green diesel. In various embodiments, the flash point of the green diesel of the present invention may be in the range of about 100° C. to about 130° C., about 110° C. to about 130° C., about 120° C. to about 130° C., or about 120° C. to about 125° C. In various embodiments, the product obtained from apparatus 139 is stream 115, which is subsequently passed through apparatus 140, wherein apparatus 140 is adapted for eliminating sulphur and decreasing acidity of stream 115, thereby forming green diesel (stream 117).

In various embodiments, the adsorption unit comprises at least one adsorbent selected from the group consisting of activated carbon, ion exchange resin, molecular sieve and chemical adsorbent. In various embodiments, the ion exchange resin may be a basic ion exchange resin or an acidic ion exchange resin. In a preferred embodiment, the adsorbent is a basic ionic exchange resin. In various embodiments, the chemical adsorbent may be basic or acidic, preferably basic. Advantageously, the adsorption unit may eliminate contaminants which may affect the efficiency of the catalyst. Furthermore, when the treated oil passes through the adsorption unit, the resultant green diesel may have desirable properties such as a lower amount or a negligible amount of contaminants such as but not limited to sulphur, an oxygen-containing compound, a triglyceride and/or acid. In various embodiments, the resultant green diesel may be substantially free of oxygen-containing compounds, substantially free of a heavy fraction (such as triglycerides or heavy paraffin content having more than 20 carbon atoms) or substantially free of both. As used herein, the term "substantially free" when used in the context of a byproduct (e.g. at least one oxygen-containing compound, at least one heavy fraction or a mixture thereof) in green diesel refers to an amount of less than 1 wt %, less than 0.8 wt %, less than 0.6 wt %, less than 0.5 wt %, less than 0.4 wt %, less than 0.3 wt %, less than 0.2 wt %, less than 0.1 wt %, less than 0.05 wt %, or less than 0.01 wt % in the green diesel. Consequently, the green diesel may have a relatively narrow distillation range and trace amount of impurities. In various embodiments, the total glyceride content in the green diesel is equivalent to the triglyceride content in the green diesel. In various embodiments, the total glyceride content in the treated oil is equivalent to the total glyceride content in the green diesel. It would be understood by a person skilled in the art that standard tests such as EN 14105 may be used to measure the total glyceride content. In various embodiments, there is less than 1 wt %, less than 0.8 wt %, less than 0.6 w %, less than 0.5 wt %, less than 0.4 wt %, less than 0.3 wt %, less than 0.2 wt %, less than 0.1 wt %, or less than 0.05 wt % of total glycerides in the green diesel. In various embodiments, there is about 0.01 wt % to about 0.05 wt % of total glycerides in the green diesel. In various embodiments, there is about 0.038 wt % of total glycerides in the green diesel.

In contrast, prior art methods may be inferior compared to the method of the present invention because conversion of triglycerides is incomplete, therefore resulting in the presence of unreacted triglycerides. Consequently, such prior art methods may result in a green diesel having inferior quality and/or such prior art methods require an additional step to separate the unreacted triglycerides. In contrast, the method of the present invention does not require any additional step(s) to separate unreacted triglycerides, whereby each additional step may be a complicated process that requires a significant amount of energy or relatively high energy so that the removal of the unreacted triglycerides can be carried out. Advantageously, as the green diesel of the present invention is substantially free of oxygen-containing compounds, oxidation of the green diesel of the present invention may be reduced or prevented. As such, good thermal oxidation stability may be achieved.

In various embodiments, the adsorption unit may be a column (or an adsorption column) or a set of columns (or adsorption columns). In various embodiments, more than one adsorption unit may be used.

In various embodiments, the adsorption of contaminants such as but not limited to heavy metals, sulphur compounds and acids from the treated oil may proceed at atmospheric pressure, at a temperature of about 30° C. to about 70° C. and a space velocity of about 0.5 $h^{-1}$ to 2.0 $h^{-1}$.

In various embodiments, the temperature of the adsorption unit does not need to be adjusted, thereby leading to ease of operation. In addition, the temperature of the adsorption unit may be selected based on the temperature of the bio-based material or the treated oil.

In various embodiments, the method further comprises passing the treated oil through at least one distillation column to separate the treated oil into at least one component. In other words, more than one distillation columns may be coupled to each other. As such, the method further comprises the step of distillation, in particular but not limited to, vacuum distillation. In various embodiments, the distillation column may comprise at least one packed column or at least one tray column. In an embodiment, there may be four distillation columns. In various embodiments, the distillation column may be part of a distillation unit. In other words, the distillation unit may comprise at least one distillation column and other components.

In various embodiments, the distillation may be carried out in batch mode or continuous mode. In various embodiments, the distillation may occur at a pressure of about 5 millibar (mbar) to about 100 mbar. In various embodiments, the temperature at the top of the distillation column may be about 120° C. to about 190° C., while the temperature in the reboiler may be about 170° C. to about 230° C.

In various embodiments, PCM may be obtained and possess desirable characteristics such as being odor-less. In other words, the scent of the PCM may be eliminated. In contrast to a PCM obtained by a prior art method, the PCM of the present invention may have comparable or better purity, a different range of melting temperature and/or a different heat storage capacity or heat of fusion. In various embodiments, the PCM may be obtained in a yield of about 60% to about 80% of PCM portion in the treated oil (or treated oil feed). In various embodiments, the isoparaffin content in PCM is in the range of about 0 wt % to about 1 wt % and the n-paraffin content in PCM is in the range of about 99 wt % to about 100 wt %.

In various embodiments, the at least one component is selected from the group consisting of n-paraffin having less than 16 carbon atoms, n-hexadecane (n-C6), n-heptadecane (n-C17), n-octadecane (n-C18) and n-paraffin having more than 18 carbon atoms. In various embodiments, the at least one component may be an industrial solvent. In various embodiments, the purity of the at least one component is high. In various embodiments, the industrial solvent may have high purity because it comprises at least 99 wt % n-paraffins. Consequently, the industrial solvent may predominantly contain n-paraffins and therefore have good oxidation thermal stability. In other words, the industrial solvent consists essentially of n-paraffin, wherein the n-paraffin may be at least one kind of n-paraffin.

In various embodiments and as illustrated in Table 8, the industrial solvent obtained from the method of the present invention may comprise less than 1 ppm of sulphur and less than 1 wt % or negligible (not detectable via analytical methods) aromatic compounds (or aromatic content). In various embodiments, the industrial solvent may contain less than or equal to 50 parts per million by weight (ppmw) of water. In contrast, commercially available green diesels may have a significantly higher amount of water, such as 2,000 ppmw of water. In various embodiments, the industrial solvent of the present invention may have other features such as but not limited to: relatively high flash point, relatively narrow distillation range, low viscosity, mild colour, mild odour, low density, non-polar, and low reactivity. In various embodiments, the industrial solvent may be a non-flammable liquid because it has a relatively high flash point. In various embodiments, the flash point of the industrial solvent may be about 120° C. to about 130° C. In various embodiments, the distillation range of the industrial solvent is in the range of about 240° C. to about 280° C. or about 250° C. to about 270° C. In various embodiments, the IBP of the industrial solvent is at least 240° C. or at least 250° C. In various embodiments, the FBP of the industrial solvent is at most 280° C. or at most 27° C.

Figure 2:
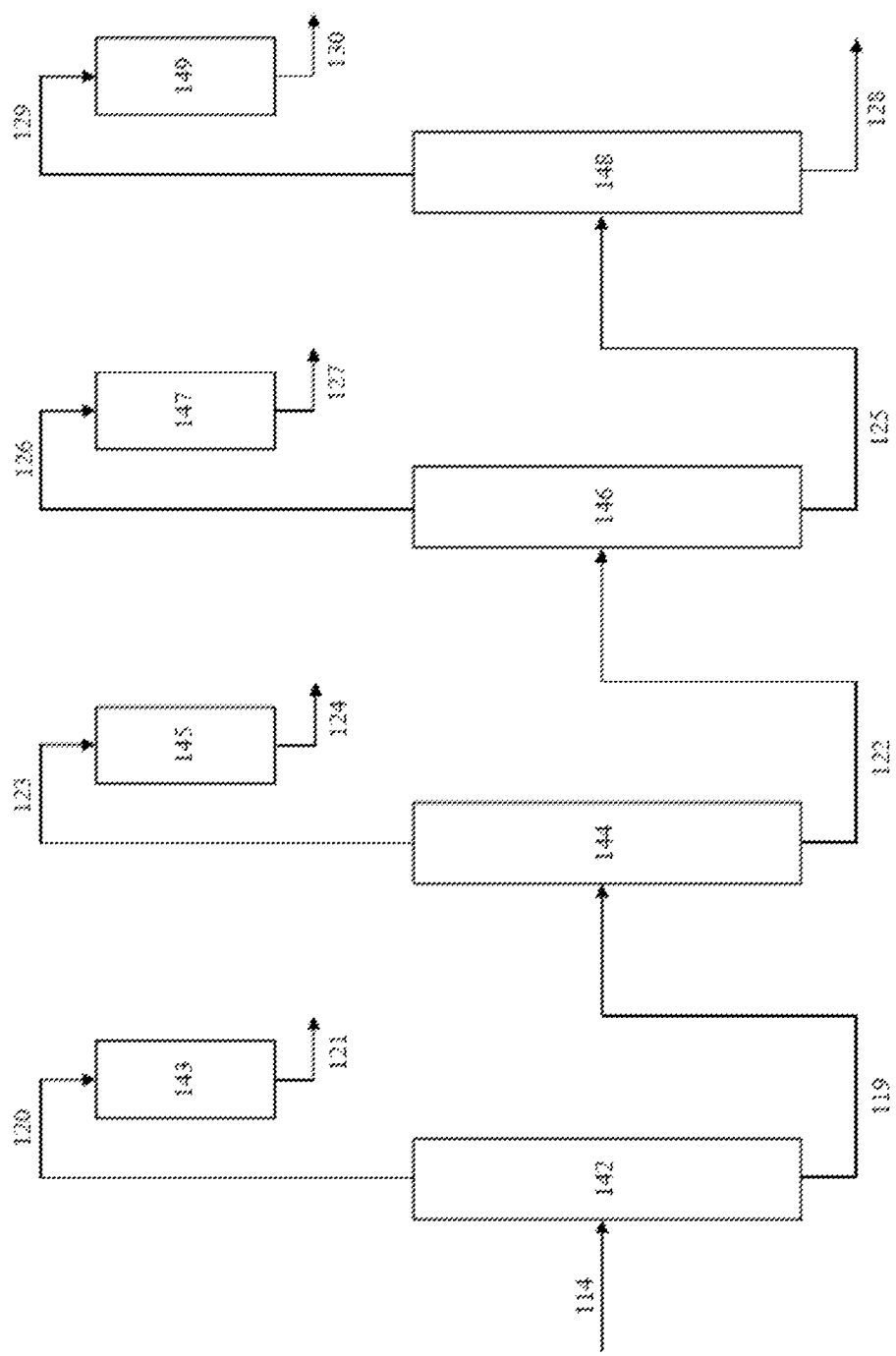
FIG. 2 illustrates a flow diagram of preparing at least one phase change material and an industrial solvent using the treated oil prepared from the method in FIG. 1.

In various embodiments and as illustrated in FIG. 2, the treated oil for making PCM (stream 114, wherein the composition of stream 112 is identical to stream 114) passes through a distillation column (apparatus 142), thereby separating stream 120 which contains n-paraffin having less than 16 carbons and stream 119. Stream 119 then passes through another distillation column (apparatus 144) thereby separating stream 123 which contains n-hexadecane as a main component of at least about 99.0 percent by mass and stream 122. Stream 122 then passes through another distillation column (apparatus 146), thereby separating stream 126, which contains n-heptadecane as a main component of at least about 99.0 percent by mass and stream 125. Stream 125 then passes through another distillation column (apparatus 148), thereby separating stream 129 which contains n-octadecane as a main component of at least about 99.0 percent by mass and stream 128, which contains n-paraffin having more than 18 carbon atoms as a main component. In various embodiments, stream 128 may exit from the bottom of distillation column (apparatus 148) and used as a fuel oil (bunker oil). Accordingly, more than one distillation columns may be coupled to each other. In various embodiments, the fuel oil may be used for various applications such as but not limited to fuel for mobile engines.

In various embodiments, the method further comprises passing the at least one component through an adsorption unit. In other words, the distillation column is coupled to the adsorption unit. For example, the distillation column is connected to the adsorption unit. Advantageously, the adsorption unit may improve the quality of the at least one component by eliminating any remaining contaminants, thereby making it suitable for a desired use, such as but not limited to an industrial solvent or a PCM. Removal of the contaminants, such as but not limited to undesired volatile organic compounds, substances that may impart a bad odour or colour to the industrial solvent and/or the PCM, may minimize or eliminate undesirable characteristics of the industrial solvent or the PCM, such as but not limited to a bad odour or an undesired colour.

In various embodiments, the adsorption unit comprises at least one adsorption column, each adsorption column may comprise at least one adsorbent selected from the group consisting of activated carbon, ion exchange resin, molecular sieve and chemical adsorbent. In various embodiments, the ion exchange resin may be a basic ion exchange resin or an acidic ion exchange resin. In various embodiments, the molecular sieve may have a pore size ranging from about 3 angstrom (Å) to about 15 Å. In various embodiments, the chemical adsorbent may be basic or acidic, preferably basic.

In various embodiments, when a contaminant flows through an adsorption unit and contacts an adsorbent, the contaminant is adsorbed by the adsorbent.

In various embodiments, the adsorption may proceed at atmospheric pressure, at a temperature of about 30° C. to about 70° C. and a space velocity of about 0.5 h$^{-1}$ to 2.0 h$^{-1}$.

In various embodiments, the temperature of the adsorption unit does not need to be adjusted, thereby leading to ease of operation. In addition, the temperature of the adsorption unit may be selected based on the temperature of the input stream, such as but not limited to stream 120, stream 123, stream 126 and stream 129.

In various embodiments and as illustrated in FIG. 2, stream 120 passes through an adsorption unit (apparatus 143) to form stream 121, which is suitable to be an industrial solvent.

In various embodiments and as illustrated in FIG. 2, stream 123 passes through an adsorption unit (apparatus 145) to form stream 124, which is suitable to be a PCM (PCM #1).

In various embodiments and as illustrated in FIG. 2, stream 126 passes through an adsorption unit (apparatus 147) to form stream 127, which is suitable to be a PCM (PCM #2).

In various embodiments and as illustrated in FIG. 2, stream 129 passes through an adsorption unit (apparatus 149) to form stream 130, which is suitable to be a PCM (PCM #3).

In another aspect of the present invention, there is provided green diesel obtainable by the method described above, wherein the green diesel comprises isoparaffin in an amount of 0 to 10 wt % and n-paraffin in an amount of 90 to 100 wt %.

In various embodiments, the distillation range of the green diesel is relatively narrow. In various embodiments, the distillation range of the green diesel is in the range of about 200° C. to about 350° C., about 250° C. to about 330° C., about 255° C. to about 330° C., about 255° C. to about 325° C., about 260° C. to about 325° C., about 260° C. to about 330° C., about 250° C. to about 323° C., or about 260° C. to about 323° C. In various embodiments, the initial boiling point (IBP) of the green diesel is in the range of about 200° C. to about 350°, preferably about 250° C. to about 310° C., about 250° C. to about 270° C., about 255° C. to about 265° C. In various embodiments, the IBP is at least 250° C., at least 255° C. or at least 260° C. Compared with commercially available green diesels, the IBP of the green diesel of the present invention may be relatively higher. In various embodiments, the IBP of the green diesel of the present invention may be about 260.5° C., whereas the IBP of a first commercially available green diesel is 180° C., while the IBP of a second commercially available green diesel is 173° C. Consequently, this shows that the green diesel of the present invention has a higher composition (or proportion) of normal paraffin having high carbon atoms (such as n-C15 to n-C18) than commercially available green diesels.

In various embodiments, the final boiling point (FBP) of the green diesel is lower than commercially available green diesels. In various embodiments, the FBP is at most 350° C., at most 340° C., at most 335° C., at most 330° C. or at most 325° C. Specifically, the FBP of the green diesel of the present invention is about 323.0° C., whereas the FBP of the first commercially available green diesel is 360° C. while the boiling point of a third commercially available green diesel is from 350° C. Consequently, when the green diesel of the present invention is used (or combusted), the amount of pollution generated is relatively lower than commercially available green diesels. For example, less small particles are generated from combustion of the green diesel of the present invention.

In another aspect of the present invention, there is provided a phase change material obtainable by the method described above, wherein the phase change material comprises isoparaffin in an amount of 0 to 1 wt % and n-paraffin in an amount of 99 to 100 wt %.

In accordance with another aspect of the invention and as illustrated in FIG. 1, there is provided a system for processing a bio-based material comprising a reactor 135 for reacting the bio-based material (stream 101) with hydrogen (stream 104) in the presence of a catalyst on a support to form a treated oil (stream 109); wherein the bio-based material (stream 101) is renewable; and wherein the reactor 135 comprises a cooling function for controlling the temperature of the reactor; wherein the cooling function is at least one of an internal cooling function and an external cooling function.

In various embodiments and as illustrated in FIG. 4, the internal cooling function may comprise a cooling substance, wherein the cooling substance may be a fresh amount of the bio-based material, a fresh amount of hydrogen, and/or a portion of the treated oil.

In various embodiments and as illustrated in FIG. 1, the system further comprises a high-pressure separator (apparatus 137) and a low-pressure separator (apparatus 138) for passing the treated oil (stream 109) through. In various embodiments, the reactor 135 is coupled to the high-pressure separator (apparatus 137). For example, the reactor 135 is connected to a heat exchanger (apparatus 136) and the heat exchanger (apparatus 136) is connected to a high-pressure separator (apparatus 137). In various embodiments, the high-pressure separator (apparatus 137) is coupled to the low-pressure separator (apparatus 138). For example, the high-pressure separator (apparatus 137) is connected to the low-pressure separator (apparatus 138).

In various embodiments, the external cooling function comprises a multi tube or a shallow bed reactor or a heat transfer unit.

In various embodiments, the external cooling function further comprises a coolant, wherein the coolant may be a fresh amount of the bio-based material, a fresh amount of hydrogen, and/or a portion of the treated oil, or a heat transfer fluid.

In various embodiments and as illustrated in FIG. 1, the system further comprises a distillation unit (apparatus 139) for passing the treated oil (stream 113) through to form green diesel (stream 117). In various embodiments, the distillation unit (apparatus 139) is coupled to the low-pressure separator (apparatus 138). For example, the distillation unit (apparatus 139) is connected to the low-pressure separator (apparatus 138).

In various embodiments and as illustrated in FIG. 1, the system further comprises an adsorption unit (apparatus 140) for passing the green diesel (stream 117) through. In various embodiments, the adsorption unit (apparatus 140) is coupled to the distillation unit (apparatus 139). For example, the adsorption unit (apparatus 140) is connected to the distillation unit (apparatus 139).

In various embodiments and as illustrated in FIG. 2, the system further comprises at least one distillation column (such as apparatus 142, apparatus 144, apparatus 146, apparatus 148) to separate the treated oil into at least one component. In various embodiments, one of the at least one distillation column (such as apparatus 142) is coupled to the low-pressure separator (apparatus 138). For instance, the distillation column (apparatus 142) is connected to the low-pressure separator (apparatus 138).

In various embodiments and as illustrated in FIG. 2, the system further comprises an adsorption column (such as apparatus 143, apparatus 145, apparatus 147, apparatus 149) for passing the at least one component through. In various embodiments, the adsorption column may be part of an adsorption unit. In various embodiments, the adsorption column (such as apparatus 143) is coupled to the distillation column (such as apparatus 142). For instance, the adsorption column (apparatus 143) is connected to the distillation column (apparatus 142), the adsorption column (apparatus 145) is connected to the distillation column (apparatus 144), the adsorption column (apparatus 147) is connected to the distillation column (apparatus 146), and the adsorption column (apparatus 148) is connected to the distillation column (apparatus 148).

Figure 3:
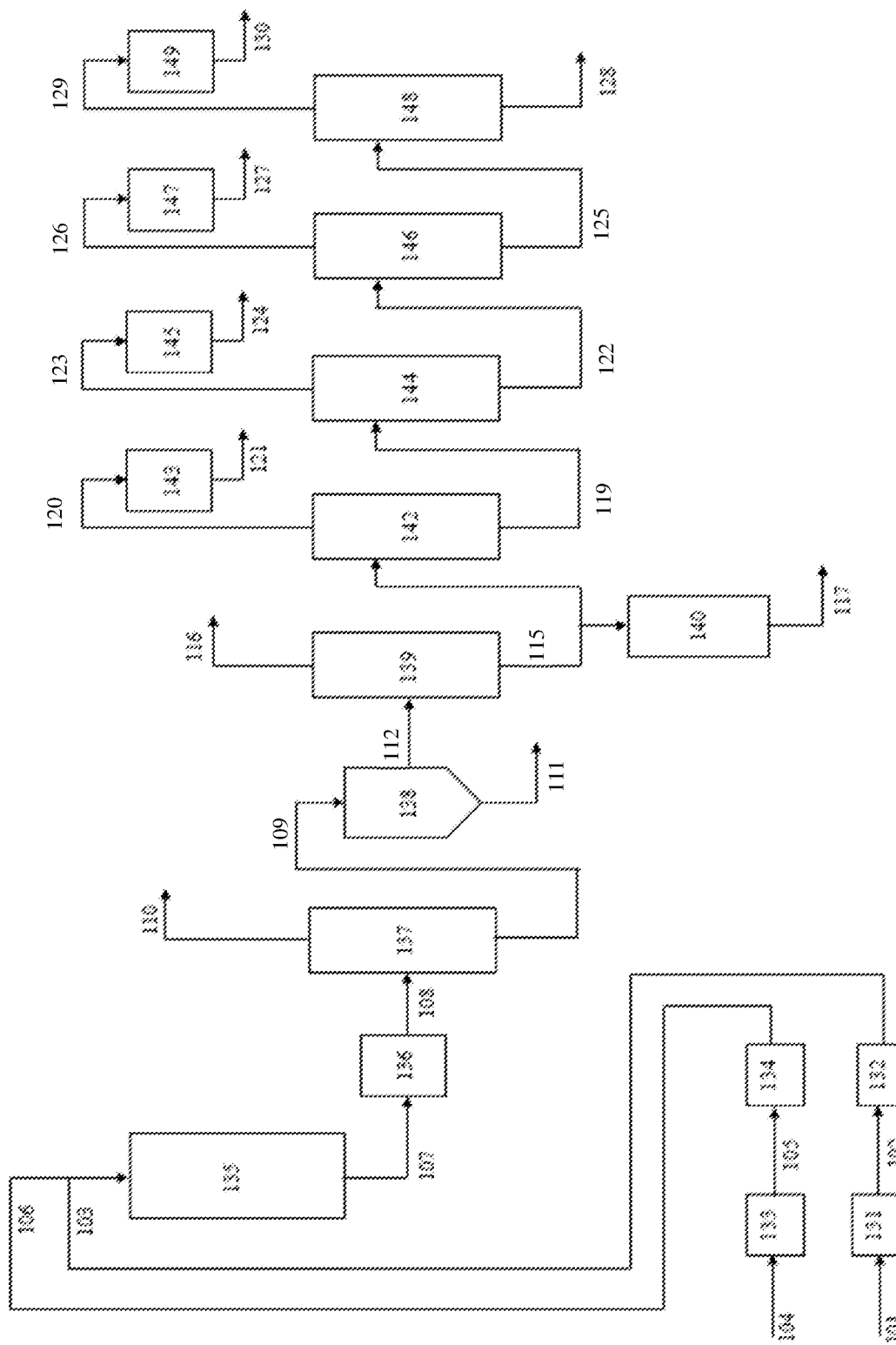
FIG. 3 illustrates a flow diagram of an alternative method for preparing treated oil, green diesel, at least one phase change material and an industrial solvent.

In accordance with another aspect of the invention and as illustrated in FIG. 3, there is an alternative method for preparing green diesel and PCM. In various embodiments, the method of processing a renewable bio-based material comprises the step of reacting the bio-based material with hydrogen in the presence of a catalyst on a support in a reactor to form a treated oil; (i) passing the treated oil through a distillation unit and an adsorption unit to form green diesel; and/or (ii) passing the treated oil through at least one distillation column to separate the treated oil into at least one component and passing the at least one component through an adsorption column; and wherein the reactor comprises a cooling function for controlling the temperature of the reactor; wherein the cooling function is at least one of an internal cooling function and an external cooling function.

Similar to the method illustrated in FIG. 1, a bio-based material (stream 101) may be passed through a pump (apparatus 131), wherein apparatus 131 is adapted to control the flow rate and pressure of the bio-based material. As such, when stream 101 passes through apparatus 131, stream 102 is formed, wherein stream 102 comprises the bio-based material having a predetermined flow rate and pressure, and wherein the pressure of stream 102 is higher than the pressure of stream 101. Stream 102 then passes through a heat exchanger (apparatus 132), wherein apparatus 132 is adapted to increase the temperature of stream 102, thereby forming stream 103 which comprises the bio-based material having a predetermined temperature, wherein the temperature of stream 103 is higher than the provided a system for processing a bio-based material comprising a reactor 135 for reacting the bio-based material (stream 101) with hydrogen (stream 104) in the presence of a catalyst on a support to form a treated oil (stream 109); wherein the bio-based material (stream 101) is renewable; and wherein the reactor 135 comprises a cooling function for controlling the temperature of the reactor; wherein the cooling function is at least one of an internal cooling function and an external cooling function.

Similar to the method illustrated in FIG. 1 and as illustrated in FIG. 3, stream 103 and stream 106 may react by contacting the surface of the catalyst in the reactor, thereby producing a treated oil (stream 107). In various embodiments, stream 107 then passes through a heat exchanger (apparatus 136) followed by a high-pressure separator (apparatus 137) and a low-pressure separator (apparatus 138). In various embodiments, the method illustrated in FIG. 1 is identical to the method illustrated in FIG. 3, except that the separation point of the treated oil is moved such that the separation point is after the distillation unit (apparatus 139) instead of after the low pressure separator (apparatus 138). In various embodiments, after passing through the high-pressure separator (apparatus 137), a purified treated oil (stream 109) and a gaseous component (stream 110) are formed. In various embodiments, after the purified treated oil (stream 109) passes through apparatus 139, low boiling point hydrocarbon compounds (stream 116) are separated out.

In various embodiments and as illustrated in FIG. 3, the treated oil for making PCM passes through a distillation column (apparatus 142), thereby separating stream 120 which contains n-paraffin having less than 16 carbons and stream 119. Stream 119 then passes through another distillation column (apparatus 144), thereby separating stream 123 which contains n-hexadecane as a main component of at least about 99.0 percent by mass and stream 122. Stream 122 then passes through another distillation column (apparatus 146), thereby separating stream 126, which contains n-heptadecane as a main component of at least about 99.0 percent by mass and stream 125. Stream 125 then passes through another distillation column (apparatus 148), thereby separating stream 129 which contains n-octadecane as a main component of at least about 99.0 percent by mass and stream 128, which contains n-paraffin having more than 18 carbon atoms as a main component. In various embodiments, stream 128 may exit from the bottom of distillation column (apparatus 148) and used as a fuel oil (bunker oil).

In various embodiments and as illustrated in FIG. 3, stream 120 passes through an adsorption unit (apparatus 143) to form stream 121, which is suitable to be an industrial solvent.

In various embodiments and as illustrated in FIG. 3, stream 123 passes through an adsorption unit (apparatus 145) to form stream 124, which is suitable to be a PCM (PCM #1).

In various embodiments and as illustrated in FIG. 3, stream 126 passes through an adsorption unit (apparatus 147) to form stream 127, which is suitable to be a PCM (PCM #2).

In various embodiments and as illustrated in FIG. 3, stream 129 passes through an adsorption unit (apparatus 149) to form stream 130, which is suitable to be a PCM (PCM #3).

In various embodiments, it would be understood by a person skilled in the art that the PCM (PCM #1, PCM #2, PCM #3) obtained from the alternative method illustrated in FIG. 3 is identical to the corresponding PCM (PCM #1, PCM #2, PCM #3) obtained from the method illustrated in FIG. 2.

In various embodiments and as illustrated in FIG. 3, instead of passing through the distillation column (apparatus 142), the purified treated oil may pass through an adsorption unit (apparatus 140). In various embodiments, apparatus 140 is adapted for eliminating sulphur and decreasing acidity of stream 115, thereby forming green diesel (stream 117). It would be understood by a person skilled in the art that the green diesel obtained from the method illustrated in FIG. 3 is identical to the green diesel obtained from the method illustrated in FIG. 1.

In accordance with another aspect of the invention and as illustrated in FIG. 3, them is provided a system for processing a bio-based material comprising a reactor 135 for reacting the bio-based material (stream 101) with hydrogen (stream 104) in the presence of a catalyst on a support to form a treated oil (stream 109); wherein the bio-based material (stream 101) is renewable; and wherein the reactor 135 comprises a cooling function for controlling the temperature of the reactor; wherein the cooling function is at least one of an internal cooling function and an external cooling function.

In various embodiments, the system further comprises a high-pressure separator (apparatus 137) and a low-pressure separator (apparatus 138) for passing the treated oil (stream 109) through. In various embodiments, the reactor 135 is coupled to the high-pressure separator (apparatus 137). For example, the reactor 135 is connected to a heat exchanger (apparatus 136) and the heat exchanger (apparatus 136) is connected to a high-pressure separator (apparatus 137). In various embodiments, the high-pressure separator (apparatus 137) is coupled to the low-pressure separator (apparatus 138). For example, the high-pressure separator (apparatus 137) is connected to the low-pressure separator (apparatus 138).

In various embodiments, the system further comprises a distillation unit (apparatus 139) for passing the treated oil (stream 113) through. In various embodiments, the distillation unit (apparatus 139) is coupled to the low-pressure separator (apparatus 138). For example, the distillation unit (apparatus 139) is connected to the low-pressure separator (apparatus 138).

In various embodiments, the system further comprises an adsorption unit (apparatus 140) for passing the green diesel (stream 117) through. Alternatively or in addition, the system further comprises at least one distillation column (such as apparatus 142, apparatus 144, apparatus 146, apparatus 148) to separate the treated oil into at least one component.

In various embodiments, the adsorption unit (apparatus 140) is coupled to the distillation unit (apparatus 139). For example, the adsorption unit (apparatus 140) is connected to the distillation unit (apparatus 139).

In various embodiments, one of the at least one distillation column (such as apparatus 142) is coupled to the distillation unit (apparatus 139). For instance, the distillation column (apparatus 142) is connected to the distillation unit (apparatus 139).

In various embodiments, the system further comprises an adsorption column (such as apparatus 143, apparatus 145, apparatus 147, apparatus 149) for passing the at least one component through. In various embodiments, the adsorption column may be part of an adsorption unit. In various embodiments, the adsorption column (such as apparatus 143) is coupled to the distillation column (such as apparatus 142). For instance, the adsorption column (apparatus 143) is connected to the distillation column (apparatus 142), the adsorption column (apparatus 145) is connected to the distillation column (apparatus 144), the adsorption column (apparatus 147) is connected to the distillation column (apparatus 146), and the adsorption column (apparatus 148) is connected to the distillation column (apparatus 148).

EXAMPLES

Example 1

Different catalysts on an acidic porous solid support were used and the effects/results obtained are shown in Table 1.

TABLE 1

Different types of catalysts and their effects/results

| Types of catalysts | Effects/Results |
|---|---|
| CoMo/Al$_2$O$_3$ | Efficiency of the catalyst is lower than the catalysts in the group of NiMo in every experimental condition<br>Treated oil obtained with a lot of vegetable oil (starting material) mixed with the treated oil<br>Volume of isoparaffin in treated oil is high |
| NiMo/Al$_2$O$_3$ | Efficiency of the catalyst is high<br>Catalyst activated the hydrodeoxygenation reaction<br>Treated oil obtained without any remaining vegetable oil (starting material)<br>Volume of isoparaffin in the treated oil is low |
| NiW/Al$_2$O$_3$ | Efficiency of the catalyst is high<br>Catalyst activated the hydrodeoxygenation reaction<br>Treated oil obtained without any remaining vegetable oil (starting material)<br>Volume of isoparaffin in the treated oil is low |
| NiCoMo/Al$_2$O$_3$ | Efficiency of the catalyst is high<br>Catalyst activated the decarboxylation reaction, decarbonylation reaction and isomerization reaction<br>Treated oil obtained without any remaining vegetable oil (starting material)<br>Volume of n-C15 and n-C17 in treated oil is high<br>Volume of isoparaffin in treated oil is high |
| NiMoP/Al$_2$O$_3$ | Efficiency of the catalyst is high<br>Catalyst activated the isomerization reaction<br>Treated oil obtained without any remaining vegetable oil (starting material).<br>Volume of isoparaffin in treated oil is high |

Example 2

Factors that affect the efficiency of the catalyst were investigated and are shown in Table 2.

TABLE 2

Various factors and their effects/results on the catalyst

| Factors | Effects/Results |
|---|---|
| Heavy metal in bio-based material | Active sites of the catalyst were destroyed by the heavy metal<br>Efficiency of the catalyst decreased rapidly<br>Irreversible damage to efficiency of the catalyst (i.e. unable to recover efficiency) |
| Phospholipid compound in bio-based material | Active sites of the catalyst are occupied by the phospholipid compound, thereby leading to a loss in available active sites for catalyst to react the bio-based material with hydrogen<br>Efficiency of the catalyst was decreased rapidly<br>Irreversible damage to efficiency of the catalyst (i.e. unable to recover efficiency) |
| Lack of hydrogen | Active sites of the catalyst were covered by coke from the reaction of vegetable oil without hydrogen<br>Efficiency of the catalyst decreased rapidly due to direct contact of bio-based material with the catalyst<br>Irreversible damage to efficiency of the catalyst (i.e. unable to recover efficiency) |

TABLE 2-continued

Various factors and their effects/results on the catalyst

| Factors | Effects/Results |
|---|---|
| Lack of bio-based material | Active sites of the catalyst were transformed to a new type of active site with lower efficiency<br>Efficiency of the catalyst decreased due to direct contact of hydrogen with the catalyst<br>Efficiency of some parts of the catalyst was recovered by adding sulfidation agent |
| Lack of sulfidation agent | Active sites of the catalyst lose the sulfur without receiving the substitute sulfur<br>Efficiency of the catalyst decreased<br>Efficiency of the catalysts was recovered by continuously adding sulfidation agent |

Example 3

A method in accordance with embodiments of the present invention was carried out using palm olein as feedstock, hydrogen and the catalyst used was NiMo on Al$_2$O$_3$, to prepare treated oil. The temperature of the reactor was varied from 300° C. to 360° C. at a pressure of 30-70 bars, space velocity was 1.0 hr$^{-1}$ and ratio of hydrogen gas to palm olein was 0.06 g hydrogen/g oil.

Selected examples of the properties of the treated oil are shown in Table 3.

TABLE 3

Effect of temperature on properties of treated oil

| Test No. | Temperature (Celsius) | Pressure (Bar) | Acid Value | Cloud Point (Celsius) |
|---|---|---|---|---|
| 1 | 300 | 35 | 0.113 | 23.8 |
| 2 | 320 | 35 | 0.074 | 23.0 |
| 3 | 340 | 35 | 0.050 | 22.5 |
| 4 | 350 | 35 | 0.035 | 22.2 |
| 5 | 360 | 35 | 0.040 | 22.2 |

Example 4

Another method in accordance with embodiments of the present invention was carried out to illustrate the effect of using different catalysts, such as NiMo/Al$_2$O$_3$ and NiCoMo/Al$_2$O$_3$, in the method of preparing a treated oil. The temperature of the reactor was 330° C. at a pressure of 35 bars, space velocity was 1.0 hr$^{-1}$ and ratio of hydrogen to palm olein was 0.06 g hydrogen/g oil.

The properties of the obtained treated oil are shown in Table 4.

TABLE 4

Effect of catalyst on properties of treated oil

| Property of Treated Oil | Catalyst | |
|---|---|---|
| | NiMo/Al$_2$O$_3$ | NiCoMo/Al$_2$O$_3$ |
| Amount of branched-chain Paraffins (wt %) | 0.9-1.2 | 4.3-4.6 |
| Other components having Carbon less than 15 | 2.9 | 2.8 |
| Cloud Point Value | 22.9 | 21.9 |
| Acid Value | 0.009-0.171 | 0.026-0.096 |

The results in Table 4 show that the NiCoMo/Al$_2$O catalyst led to a higher amount of branched-chain paraffins in the resultant green diesel relative to the NiMo/Al$_2$O$_3$ catalyst. Without wishing to be bound by theory, it is believed that the NiCoMo/Al$_2$O$_3$ catalyst will cause an isomerization reaction, which will convert linear-chain paraffin products to branched-chain paraffin products, as reflected by the cloud point of the products. In particular, since linear-chain paraffin products have the same number of carbon atoms as branched-chain paraffin products, branched-chain paraffin products will have a lower melting point than linear-chain paraffin products. Therefore, a higher amount of branched-chain paraffins will lead to a decrease to the cloud point of the resultant green diesel.

The results in Table 4 also show that the amount of branched-chain paraffins in the products prepared using the NiMo/Al$_2$O$_3$ catalyst is lower than the products obtained from the NiCoMo/Al$_2$O$_3$ catalyst, which means that the treated oil obtained using the NiMo/Al$_2$O$_3$ catalyst is more suitable for PCM production.

Furthermore, it was found that both catalysts, NiCoMo/Al$_2$O$_3$ and NiMo/Al$_2$O$_3$, provided products having similar acid values, thereby showing that they have similar catalytic efficiencies.

Example 5

A method in accordance with some embodiments of the present invention was carried out using palm olein as feedstock, hydrogen and the catalyst used was NiMo on Al$_2$O$_3$, to prepare treated oil suitable for preparing a PCM. The temperature of the reactor was 330° C. at a pressure of 35 bars, space velocity was 1.0 hr$^{-1}$ and ratio of hydrogen to palm olein was 0.06 g hydrogen/g oil.

The treated oil was passed through a method of separation to remove undesired by products and gases. Subsequently, the treated oil was introduced into a vacuum distillation tower in accordance with embodiments of the present invention.

The volume and composition of the PCM products and by-products obtained from using 100 litres of treated oil are shown in Table 5.

TABLE 5

Properties of PCM products and by-products obtained

|  | Phase Change Material #01 | Phase Change Material #02 | Phase Change Material #03 |
|---|---|---|---|
| Product volume (Liter) | 20 | 7 | 26 |
| C$_{15}$ | 0.2 | 0.0 | 0.0 |
| C$_{16}$ | 99.5 | 0.1 | 0.0 |
| C$_{17}$ | 0.0 | 99.3 | 0.0 |
| C$_{18}$ | 0.0 | 0.3 | 99.5 |
| Other | 0.3 | 0.3 | 0.5 |

Example 6

A method in accordance with embodiments of the present invention was carried out using various bio-based material as feedstock, hydrogen and the catalyst used was NiMo on Al$_2$O$_3$, to prepare treated oil suitable for preparing green diesel. The temperature of the reactor was 350° C. at a pressure of 35 bars, space velocity was 1.0 hr$^{-1}$ and ratio of hydrogen to bio-based material was 0.06 g hydrogen/g bio-based material.

The following bio-based materials were used: Bleached Palm Oil (BPO), palm olein, and Palm Fatty Acid Distillate (PFAD) and the effect of the various bio-based materials are shown in Table 6.

TABLE 6

Effect of bio-based material on properties of green diesel

| Property of Green Diesel | Bio-Based Material | | |
|---|---|---|---|
| | Bleach Palm Oil | Palm Olein | PFAD |
| Other components having less than 15 Carbon | 2.7-2.9 | 2.0-3.1 | 2.9-3.1 |
| Cloud Point Value | 21.6 | 22.9 | 23.8 |
| Acid Value | 0.015-0.094 | 0.009-0.171 | 0.031-0.202 |

The results show that the cloud point value and amount of other components having less than 15 carbon atoms will change slightly depending on the different bio-based material. However, assuming that there is no contamination due to the bio-based material, using a different bio-based material will not affect the catalyst efficiency, as reflected by the similar acid value of treated oil obtained.

Example 7

A method in accordance with embodiments of the present invention was carried out to further process treated oil from Example 4 to form PCM and an industrial solvent. NiMo/Al$_2$O$_3$ was used as the catalyst and the method is identical to that illustrated in FIGS. 1 and 2. Consequently, an industrial solvent (GTR1) and three different PCMs (PCM #01, #02, #03) (stream 121, 124, 127 and 130 respectively) were made.

Experiments were conducted to study the characteristics of PCM #01, #02, #03 obtained from the method of the present invention. The characteristics of PCM #01, #02, #03 are shown in Table 7. Importantly, PCM #01, #02, #03 were obtained with high purity of at least 99% by weight, as analysed by Gas Chromatography-Flame Ionization Detector (GC-FID). In contrast, the commercially available PCM has a purity of about 89% to about 94%. Consequently, the commercially available PCM had a purity of about 5% to about 10% less than the PCMs obtained in the present invention.

Furthermore, experiments were conducted to study the characteristics of the industrial solvent (GTR1) obtained from the method of the present invention (Table 8). Advantageously, the industrial solvent was found to contain less than 1 ppm of sulphur and less than 1 wt % or negligible (not detectable via analytical methods) aromatic compounds.

TABLE 7

Characteristics of PCM #01, #02, #03

| Property | Phase Change Material #01 | Phase Change Material #02 | Phase Change Material #03 |
|---|---|---|---|
| Melting Point (° C.) | 17-19 | 21-23 | 27-29 |
| Heat of Melting (J/g) | 200-220 | 200-220 | 200-220 |
| Sulfur Content (ppm) | <1 ppm | <1 ppm | <1 ppm |
| Aromatic Content (wt %) | <1 wt % | <1 wt % | <1 wt % |
| Alcohol Content (ppm) | <1 ppm | <1 ppm | <1 ppm |

Note:
1 wt % is equivalent to 10,000 ppm.

TABLE 8

Characteristics of an industrial solvent (GTR1)

| Property | Standard Method | Analysis Result |
|---|---|---|
| Flash Point (° C.) | ASTM D93 | 120-130 |
| Density (gram/milliliter, g/ml) | ASTM D4052 | 0.76-0.78 |
| Vapor Pressure (kilopascal) | ASTM D4953 | 5.0-6.0 |
| Aromatic Content | IP391 | <1 ppm |
| Sulfur Content | ASTM D4294 | <1 ppm |
| Distillation Range | ASTM D86 | |
| IBP | | 250° C. |
| 50% Recovered | | 260° C. |
| FBP | | 270° C. |

The structure of PCM #01, #02, #03 and GTR1 are shown in Table 9. As illustrated in Table 9, GTR1 is a n-paraffin having 15 carbons (n-C15), PCM #01 is a n-paraffin having 16 carbons (n-C16), PCM #02 is a n-paraffin having 17 carbons (n-C17) and PCM #03 is a n-paraffin having 18 carbons (n-C18).

TABLE 9

Chemical structures of PCM #01, #02, #03 and GTR1 made using the method of the present invention

GTR1

PCM #01

PCM #02

PCM #03

Example 8

The distillation range of a green diesel obtained from the method of the present invention is shown in Table 10. In particular, the treated oil obtained from Example 4 was used, wherein NiCoMo/Al$_2$O$_3$ was used as the catalyst and the treated oil was passed through a distillation unit (apparatus 139) followed by an adsorption column (apparatus 140). As illustrated in Table 10, the distillation range of the green diesel is in the range of about 200° C. to about 350° C., in particular about 260.5° C. to about 323.0° C. Compared with commercially available green diesels, the IBP of the green diesel of the present invention is relatively higher. Specifically, the IBP of the green diesel of the present invention is 260.5° C. In contrast and for instance, the IBP of a first commercially available green diesel is 180° C., while the IBP of a second commercially available green diesel is 173° C. Consequently, this shows that the green diesel of the present invention has a higher composition (or proportion) of normal paraffin having high carbon atoms (such as n-C15 to n-C18) than the commercially available green diesels.

Furthermore, it can be seen that the final boiling point (FBP) of the green diesel of the present invention is lower than commercially available green diesels. Specifically, the FBP of the green diesel of the present invention is 323.0° C.

In contrast and for instance, the FBP of the first commercially available green diesel is 360° C. while the boiling point of a third commercially available green diesel is from 350° C. Consequently, when the green diesel of the present invention is used (or combusted), the amount of pollution generated is relatively lower than commercially available green diesels. For example, less small particles are generated from combustion of the green diesel of the present invention.

In addition, the green diesel of the present invention is substantially free of oxygen-containing compounds (i.e. no oxygen-containing compounds). In contrast, commercially available green diesels may contain oxygen-containing compounds. Due to the absence of oxygen-containing compounds, oxidation of the green diesel of the present invention may be reduced or prevented. As such, good thermal oxidation stability is achieved. Consequently, the green diesel of the present invention has a long-lasting quality and long-term storage. For instance, the green diesel of the present invention has an oxidation stability of 35 hours according to EN 15751. Advantageously, additives such as antioxidants are not required to increase the shelf life of the green diesel of the present invention.

TABLE 10

Characteristics of a green diesel

| Property | Standard Method | Analysis Result |
|---|---|---|
| Density | ASTM D4052 | 0.7822 g/ml |
| Aromatic Content | IP391 | 6000 ppm (0.6 wt %) |
| Viscosity | ASTM D445 | 3.092 mm$^2$/s |
| Sulfur Content | ASTM D5453 | 0-10 ppm |
| Water Content | ASTM D6304 | 17 ppm |
| Flash Point | ASTM D93 | 124° C. |
| Oxidation Stability | EN 15751 | 35 Hours |
| Distillation Range | ASTM D86 | |
| IBP | | 260.5° C. |
| 5% | | 276.5° C. |
| 10% | | 282.5° C. |
| 20% | | 284.0° C. |
| 30% | | 286.5° C. |
| 40% | | 288.5° C. |
| 50% | | 290.0° C. |
| 60% | | 291.0° C. |
| 70% | | 292.0° C. |
| 80% | | 295.0° C. |
| 90% | | 299.0° C. |
| 95% | | 310.0° C. |
| FBP | | 323.0° C. |
| % Recovery | | 96.6% vol. |
| % Residue | | 3.1% vol. |
| % Loss | | 0.3% vol. |

Comparative Example 1

An industrial solvent of the present invention, GTR1 from Example 7, was compared with a series of aliphatic mineral spirits, ShelSol™ D38 (A1), ShellSol™ D40 (A2), Shell-Sol™ D60 (A3), ShellSol™ D70 (A4), ShellSol™ D80 (A5), ShellSol™ D90 (A6) and ShellSol™ D100 (A7) (Table 11). The information regarding the series of aliphatic mineral spirits A1 to A7 is based on the technical datasheets prepared by Shell™ and the test methods are as follows: American Society for Testing and Materials (ASTM) D56 was used to measure the flash point of A1 to A3, ASTM D93 was used to measure the flash point of A4 to A7, ASTM D4052 was used to measure the density of A1 to A7, gas chromatography (GC) was used to measure the aromatic content and the sulfur content of A1 to A3, Shell Method Series (SMS) 2728 was used to measure the aromatic content of A4 to A7, International Organization for Standards (ISO) 20846 was used to measure the sulfur content of A4 to A7, ASTM D86 was used to measure the distillation range of A1 to A7. Aliphatic mineral spirits are products of petroleum refinery and are produced by (i) fractionation and hydrogenation of petroleum feedstock such as virgin naphtha and full range naphtha, or (ii) fischer-tropsch process of natural gas feedstock. They are low viscosity solvents and have low aromatic content.

As illustrated in Table 11, an industrial solvent of the present invention such as GTR1 has several advantages over the series of aliphatic mineral spirits, namely, A1 to A7. For instance, the flash point of GTR1 is significantly higher than that of A1 to A7. Due to the production process and nature of the feedstock, aliphatic mineral spirits contain lighter hydrocarbon compounds, thereby causing the flash point to be lower than that of GTR1. A higher flash point allows GTR1 to be rendered a non-flammable liquid. In general, any liquid that has a flash point below 93° C. is considered a flammable liquid.

In addition, the distillation range of the industrial solvent of the present invention such as GTR1 is significantly narrower than that of the aliphatic mineral spirits. This is because GTR1 predominantly contains n-C15 and smaller amount of lighter ends (or light fraction). Furthermore, the aromatic content of the industrial solvent of the present invention such as GTR1 is lower than that of the aliphatic mineral spirits (<1 ppm vs <200 ppm). This is caused by the fact that petroleum feedstock usually contains a considerable amount of aromatics and the hydrogenation unit (a step in the process whereby aromatics are converted into aliphatics) always leaves trace amount of aromatics in the aliphatic mineral spirits. In contrast, the method of the present invention allows for usage of aromatic-free feedstock because a bio-based material is used as the feedstock instead. Therefore, the presence of aromatic contents in the desired products has been avoided intrinsically.

Thermal oxidation stability of the industrial solvent of the present invention such as GTR1 is also superior when compared to the series of aliphatic mineral spirits. Good thermal oxidation stability of GTR1 is achieved because GTR1 predominantly contains n-paraffins as a primary component. N-paraffins are more resilient to oxidation reactions compared to aliphatic compounds. This characteristic is of utmost importance if the industrial solvent is going to be used for an extended period of time. In particular, when the industrial solvent has better thermal oxidation stability, it is more resilient to the environment and can keep or maintain its properties within an acceptable limit for a longer period of time. Consequently, the industrial solvent of the present invention has a long-lasting quality and long-term storage.

Comparative Example 2

Most commercially available industrial solvents are petroleum-based. Nonetheless, biomass-derived industrial solvents have been studied and commercially produced. Such industrial solvents are derived from biomass such as starch, callus, carbohydrate, lignin, terpene and protein. However, these bio-mass derived industrial solvents do not have properties that are considered comparable with an industrial solvent of the present invention, such as GTR1.

An example of a biomass-derived industrial solvent is a triglyceride-derived solvent. Triglyceride-derived solvents can be categorized as fatty acid methyl esters (FAME) and glycerol-derived solvents. FAME can be produced by either (i) transesterification of triglycerides or (ii) esterification of fatty acids. Comparing an industrial solvent of the present invention, such as GTR1 of Example 7, with FAME, although FAME has been widely used as a biofuel, its usage as an industrial solvent has been limited due to its poor properties. Cargill's Agri-Pure™ AP-406 (A8) is an example of a FAME solvent derived from vegetable oil. Although FAME has a low amount of aromatics, a low amount of sulfur, and a high flash point, its chemical structure makes it incomparable with an industrial solvent of the present invention, such as GTR1 in Example 7. In particular, FAME has an ester functional group whereas an industrial solvent of the present invention, such as GTR1, contains predominantly n-paraffins. Consequently, properties such as thermal oxidation stability, viscosity and colour are different between an industrial solvent of the present invention and FAME. For instance and as mentioned above, an industrial solvent of the present invention has good thermal oxidation stability because it predominantly contains n-paraffin.

As mentioned above, FAME can be produced by transesterification of triglycerides. Glycerol is an important byproduct when transesterification of triglycerides is used for FAME production. Due to its nature of being a highly functionalized compound, glycerol can be converted into many kinds of solvents. In particular, the presence of three (3) hydroxyl groups in glycerol allows each of the three hydroxyl groups to be functionalized independently of each other. Examples of industrial solvents that can be derived from glycerol include but are not limited to triacetin (A9), glycerol formal (A10), 1-3 propanediol, 1, 3-dimethoxypropan-2-ol, 1, 2, 3-trimethoxypropane, solketal and glycerol carbonate (A11). Due to the distinctly different chemical structure of glycerol-derived industrial solvents and the industrial solvents of the present invention, the properties and applications are different. An industrial solvent of the

TABLE 11

Comparison of industrial solvent of the present invention and a series of aliphatic mineral spirits

|  | GTR1 | A1 | A2 | A3 | A4 | A5 | A6 | A7 |
|---|---|---|---|---|---|---|---|---|
| Properties |  |  |  |  |  |  |  |  |
| Flash Point (° C.) | 120-130 | 42 | 44 | 63 | 78 | 83 | 92 | 103 |
| Density (g/ml) | 0.76-0.78 | 0.778 | 0.784 | 0.808 | 0.796 | 0.820 | 0.801 | 0.803 |
| Aromatic Content (ppm) | <1 | <1,000 | <5,000 | 1,000 | <200 | <5,000 | 200 | 200 |
| Sulfur Content (ppm) | <1 | <1 | <1 | <1 | <0.5 | <1 | <0.5 | <0.5 |
| Distillation Range |  |  |  |  |  |  |  |  |
| IBP (° C.) | 250 | 157 | 160 | 187 | 203 | 212 | 220 | 234 |
| 50% Recovered (° C.) | 260 | 165 | 173 | 194 | N/A | 234 | N/A | N/A |
| FBP (° C.) | 270 | 181 | 197 | 205 | 237 | 295 | 268 | 259 |

N/A: Not available present invention, GTR1 from Example 7, was compared with Cargill's Agri-Pure™ AP-406 (A8), triacetin (A9), glycerol formal (A10) and glycerol carbonate (A11) (Table 12) to illustrate the differences.

TABLE 12

Comparison of industrial solvent of the present invention and various glycerol-derived industrial solvents

| Properties | GTR1 | A8 | A9 | A10 | A11 |
|---|---|---|---|---|---|
| Flash Point (° C.) | 120-130 | 155 | 151 | 97 | >190 |
| Density (g/ml) | 0.76-0.78 | 0.883 | 1.16 | 1.21 | 1.4 |
| Water Content (mg/kg) | 50 | 180 | N/A | 5000 | N/A |
| Aromatic Content (ppm) | <1 | N/A | N/A | N/A | N/A |
| Sulfur Content (ppm) | <1 | N/A | N/A | N/A | N/A |
| Solubility in water (g/L) | Insoluble | Insoluble | 71.7 | Miscible | Miscible |

Comparative Example 3

Lignin is a biomass that mainly comprises of phenolic polymers and can be processed into an industrial solvent by either hydrogenolysis or pyrolysis. These processes can convert lignin into phenolic compounds. As such, when comparing an industrial solvent of the present invention, such as (GTR1 from Example 7, with typical lignin-derived solvents, lignin-derived solvents predominantly comprises aromatic compounds. Therefore, application and properties of lignin-derived solvents are drastically different from GTR1.

An example of an industrial solvent that can be derived from lignin is lignin pyrolysis oil methyl ester (LOME). Produced by pyrolysis of lignin, followed by methylation, LOME predominantly (or mainly) comprises of various anisoles and veratroles.

Moreover heterocyclic acetals can be produced from lignin. It is the only product derived from lignin that is not an aromatic compound. An example of a heterocyclic acetal that can be produced from lignin is 1, 3-dioxilane.

Due to the distinctly different chemical structure of lignin-derived industrial solvents and the industrial solvent of the present invention, the properties and applications are different. An industrial solvent of the present invention, GTR1 from Example 7, was compared with LOME (A12) and 1,3-dioxilane (A13) (Table 13) to illustrate the differences.

TABLE 13

Comparison of industrial solvent of the present invention and various lignin-derived industrial solvents

| Properties | GTR1 | A13 |
|---|---|---|
| Flash Point (° C.) | 120-130 | −5 |
| Density (g/ml) | 0.76-0.78 | 1.06 |
| Water Content (mg/kg) | 50 | N/A |
| Aromatic Content (ppm) | <1 | N/A |
| Sulfur Content (ppm) | <1 | N/A |
| Solubility in water (g/L) | Insoluble | Miscible |

It will be apparent that various other modifications and adaptations of the invention will be apparent to the person skilled in the art after reading the foregoing disclosure without departing from the spirit and scope of the invention. It is intended that all such modifications and adaptations come within the scope of the appended claims.

Further, it is to be appreciated that features from various embodiment(s), may be combined to form one or more additional embodiments.

The invention claimed is:

1. A system for processing a renewable bio-based material formed of a substantially renewable feedstock comprising a plant oil and/or an animal oil containing triglycerides and free fatty acids, the system comprising:
a first heat exchanger configured to receive a first stream composed of fresh bio-based material having a predetermined flow rate and pressure and configured to output a first heated stream composed of heated fresh bio-based material;
a distinct second heat exchanger configured to receive a second stream composed of fresh hydrogen having a predetermined flow rate and pressure and configured to output a distinct second heated stream composed of heated fresh hydrogen, which flows separately from the first heated stream;
a reactor having an input into which each of (a) the first heated stream composed of heated fresh bio-based material, and (b) the distinct second heated stream composed of heated fresh hydrogen, and which flows separately from the first heated stream, are introduced in a co-current as reactants at a ratio of 0.03-0.10 g hydrogen/g bio-based material which flow into and react within the reactor, wherein the reactor comprises a series of reactor beds each of which provides a catalyst on a support, and wherein the reactor is configured to produce at an output thereof a treated oil by one step hydrotreating in which the feedstock and the hydrogen within the reactor react in the presence of the catalyst at a temperature controlled between 200° C. to 400° C. and a pressure controlled between 25 bar to 40 bar;
a distinct third heat exchanger configured to receive the treated oil output from the reactor and reduce its temperature to output a reduced temperature treated oil having a predetermined reduced temperature;
a high-pressure separator configured to receive the reduced temperature treated oil, separate a gaseous component therefrom, and individually output the gaseous component and a purified treated oil, followed by a low-pressure separator configured to receive the purified treated oil and individually output a water component and a further purified treated oil; and
(i) a distillation unit for passing the further purified treated oil through to form green diesel and an adsorption unit for passing the green diesel through; or (ii) at least one distillation column to separate the further purified treated oil into at least one component and an adsorption column for passing the at least one component through;

wherein the adsorption unit comprises at least one adsorbent selected from the group consisting of activated carbon and ion exchange resin; and wherein the reactor comprises a nozzle that introduces a cooling substance into the reactor at an angle between perpendicular to and co-current with the flow of reactants, and not against the flow of reactants, to thereby provide the reactor with an internal cooling function for controlling the temperature of the reactor.

2. The system of claim 1, wherein the cooling substance is selected from the group consisting of a fresh amount the feedstock comprising a plant oil and/or an animal oil containing triglycerides and free fatty acids, a fresh amount of hydrogen, a portion of the treated oil and a combination thereof.

3. The system of claim 2, wherein the one-step hydrotreating provided by the reactor occurs at a temperature controlled between 250° C. to 350° C.

4. A method of processing a renewable bio-based material formed of a substantially renewable feedstock comprising a plant oil and/or an animal oil containing triglycerides and free fatty acids, the method comprising the steps of:

passing a first stream composed of fresh bio-based material having a predetermined flow rate and pressure through a first heat exchanger and outputting from the first heat exchanger a first heated stream composed of heated fresh bio-based material;

passing a second stream composed of fresh hydrogen having a predetermined flow rate and pressure through a distinct second heat exchanger and outputting from the second heat exchanger a distinct second heated stream composed of heated fresh hydrogen, which flows separately from the first heated stream;

introducing as a co-current of reactants into an input of a reactor each of (a) the first heated stream composed of heated fresh bio-based material, and (b) the distinct second heated stream composed of heated fresh hydrogen and which flows separately from the first heated stream, at a ratio of 0.03-0.10 g hydrogen/g bio-based material, wherein the reactor comprises a series of reactor beds each of which provides a catalyst on a support;

performing one step hydrotreating upon the reactants introduced into the reactor by reacting the reactants in the presence of the catalyst at a temperature controlled between 200° C. to 400° C. and a pressure controlled between 25 bar to 40 bar, and outputting from the reactor a treated oil;

passing the treated oil output from the reactor through a distinct third heat exchanger to reduce the temperature of the treated oil, and outputting from the third heat exchanger a reduced temperature treated oil having a predetermined reduced temperature;

passing the reduced temperature treated oil through a high-pressure separator to separate a gaseous component from the reduced temperature treated oil, and individually outputting from the high-pressure separator the gaseous component and a purified treated oil, followed by passing the purified treated oil through a low-pressure separator to separate a water component from the purified treated oil, and individually outputting from the low-pressure separator a water component and a further purified treated oil; and (i) passing the further purified treated oil through a distillation unit to form green diesel and further passing the green diesel through an adsorption unit; and/or (ii) passing the further purified treated oil through at least one distillation column to separate the further purified treated oil into at least one component and passing the at least one component through an adsorption column;

wherein the adsorption unit comprises at least one adsorbent selected from the group consisting of activated carbon, ion exchange resin, and molecular sieve; and wherein the reactor comprises an internal cooling function for controlling the temperature of the reactor by way of a nozzle that introduces a cooling substance into the reactor at an angle between perpendicular to and co-current with the flow of reactants, and not against the flow of reactants.

5. The method of claim 4, wherein the support is alumina ($Al_2O_3$), silica ($SiO_2$) or alumina-silica ($Al_2O_3$—$SiO_2$).

6. The method of claim 5, wherein the support is $Al_2O_3$ and the catalyst on $Al_2O_3$ is selected from the group consisting of $NiMo/Al_2O_3$ and $NiW/Al_2O_3$.

7. The method of claim 6, wherein the support is $Al_2O_3$ and the catalyst on $Al_2O_3$ is $NiW/Al_2O_3$.

8. The method of claim 5, wherein the support is $Al_2O_3$ and the catalyst on $Al_2O_3$ is selected from the group consisting of $NiCoMo/Al_2O_3$, $NiMoP/Al_2O_3$ and $CoMo/Al_2O_3$.

9. The method of claim 8, wherein the support is $Al_2O_3$ and the catalyst on $Al_2O_3$ is selected from the group consisting of $NiCoMo/Al_2O_3$ and $NiMoP/Al_2O_3$.

10. The method of claim 4, wherein the ratio of hydrogen to bio-based material in the reactor is 0.05 g hydrogen/g bio-based material to 0.07 g hydrogen/g bio-based material.

11. The method of claim 4, wherein the space velocity in the reactor is 0.5 $h^{-1}$ to 2 $h^{-1}$.

12. The method of claim 4, wherein the reactor is a trickle bed reactor or a packed bed reactor.

13. The method of claim 4, wherein the at least one component is selected from the group consisting of n-paraffin having less than 16 carbon atoms, n-hexadecane, n-heptadecane, n-octadecane and n-paraffin having more than 18 carbon atoms.

14. The method of claim 4, wherein the adsorption column comprises at least one adsorbent selected from the group consisting of activated carbon, ion exchange resin, and molecular sieve.

15. The method of claim 4, wherein the temperature in the reactor is 250° C. to 350° C.

16. The method of claim 4, wherein the pressure in the reactor is 30 bar to 40 bar.

* * * * *